United States Patent
Azami et al.

(10) Patent No.: US 10,211,451 B2
(45) Date of Patent: Feb. 19, 2019

(54) NEGATIVE ELECTRODE FOR LITHIUM ION SECONDARY BATTERY COMPRISING NEGATIVE ELECTRODE ACTIVE MATERIAL CONTAINING TWO CARBONS AND METHOD FOR MANUFACTURING LITHIUM ION SECONDARY BATTERY COMPRISING SAME

(71) Applicant: NEC Corporation, Tokyo (JP)

(72) Inventors: Takeshi Azami, Tokyo (JP); Hitoshi Ishikawa, Tokyo (JP)

(73) Assignee: NEC CORPORATION, Minato-ku, Tokyo (JP)

(*) Notice: Subject to any disclaimer, the term of this patent is extended or adjusted under 35 U.S.C. 154(b) by 189 days.

(21) Appl. No.: 14/759,677

(22) PCT Filed: Jan. 10, 2014

(86) PCT No.: PCT/JP2014/050377
§ 371 (c)(1),
(2) Date: Jul. 8, 2015

(87) PCT Pub. No.: WO2014/109406
PCT Pub. Date: Jul. 17, 2014

(65) Prior Publication Data
US 2015/0349332 A1 Dec. 3, 2015

(30) Foreign Application Priority Data

Jan. 11, 2013 (JP) .................................. 2013-004100

(51) Int. Cl.
*H01M 4/36* (2006.01)
*H01M 4/58* (2010.01)
(Continued)

(52) U.S. Cl.
CPC ......... *H01M 4/364* (2013.01); *H01M 4/0447* (2013.01); *H01M 4/133* (2013.01);
(Continued)

(58) Field of Classification Search
CPC ..... H01M 4/133; H01M 4/1393; H01M 4/583
See application file for complete search history.

(56) References Cited

U.S. PATENT DOCUMENTS 6,420,070 B1 * 7/2002 Kasamatsu ........... H01M 4/133
423/445 R
6,803,150 B1 10/2004 Iriyama et al.
(Continued)

FOREIGN PATENT DOCUMENTS

CN 1280942 C 10/2006
CN 102290572 A 12/2011
(Continued)

OTHER PUBLICATIONS

Machine Translation of JP 2001-236950 A, dated Aug. 31, 2001, retrieved Mar. 27, 2017.*
(Continued)

*Primary Examiner* — Maria Laios
*Assistant Examiner* — Robert S Carrico
(74) *Attorney, Agent, or Firm* — Sughrue Mion, PLLC

(57) ABSTRACT

The present invention relates to a negative electrode for a lithium ion secondary battery, the negative electrode containing a negative electrode active material containing a first carbon and a second carbon, in which the first carbon is spherical graphite, the second carbon is massive graphite, and the sulfur concentration in the first carbon (Sx) and the sulfur concentration in the second carbon (Sy) are each independently 0 ppm or more and 300 ppm or less.

19 Claims, 2 Drawing Sheets

(51) Int. Cl.
*H01M 4/136* (2010.01)
*H01M 10/0567* (2010.01)
*H01M 4/04* (2006.01)
*H01M 4/62* (2006.01)
*H01M 4/133* (2010.01)
*H01M 4/587* (2010.01)
*H01M 10/0525* (2010.01)
*H01M 10/058* (2010.01)
*H01M 4/02* (2006.01)

(52) U.S. Cl.
CPC .......... *H01M 4/136* (2013.01); *H01M 4/581* (2013.01); *H01M 4/587* (2013.01); *H01M 4/625* (2013.01); *H01M 10/058* (2013.01); *H01M 10/0525* (2013.01); *H01M 10/0567* (2013.01); *H01M 4/622* (2013.01); *H01M 2004/027* (2013.01); *H01M 2300/0025* (2013.01); *Y10T 29/49112* (2015.01)

(56) References Cited

U.S. PATENT DOCUMENTS

| | | | | |
|---|---|---|---|---|
| 6,806,003 | B1* | 10/2004 | Yamaguchi | H01M 4/13 429/232 |
| 2002/0197201 | A1* | 12/2002 | Fukuda | H01M 4/587 423/448 |
| 2003/0147800 | A1* | 8/2003 | Kwon | H01M 4/133 423/445 R |
| 2004/0023115 | A1 | 2/2004 | Kato et al. | |
| 2004/0043300 | A1 | 3/2004 | Utsugi et al. | |
| 2007/0054179 | A1* | 3/2007 | Kusachi | H01M 10/0525 429/65 |
| 2007/0128518 | A1* | 6/2007 | Uono | H01M 4/587 429/231.4 |
| 2009/0196816 | A1* | 8/2009 | Yamamoto | H01M 4/587 423/448 |
| 2012/0070733 | A1* | 3/2012 | Yamada | H01M 4/133 429/211 |

FOREIGN PATENT DOCUMENTS

| | | |
|---|---|---|
| JP | 2001-236950 | 8/2001 |
| JP | 2002-164051 | 6/2002 |
| JP | 2004-111109 | 4/2004 |
| JP | 2004-281368 | 10/2004 |
| JP | 2005-142004 | 6/2005 |
| JP | 3718072 | 11/2005 |
| JP | 2006-260847 | 9/2006 |
| JP | 2008-277004 | 11/2008 |
| JP | 2009-32575 | 2/2009 |
| JP | 2010-219036 | 9/2010 |
| JP | 4738553 | 8/2011 |
| JP | 4844718 | 12/2011 |
| JP | 2012-94454 | 5/2012 |
| JP | 2012-133981 | 7/2012 |

OTHER PUBLICATIONS

Machine Translation of JP 2002-164051 A, dated Jun. 7, 2002, retrieved Mar. 27, 2017.*
Chinese Office Action issued by the Chinese Patent Office in counterpart Chinese Patent Application No. 201480004566.X, dated Sep. 14, 2016.
Notice of Reasons for Rejection issued by the Japanese Patent Office in counterpart Japanese Patent Application No. 2014-556457, dated Jan. 17, 2017.
International Search Report dated Mar. 18, 2014 in corresponding PCT International application.
Extended European Search Report dated May 3, 2016 by the European Patent Office in counterpart European Patent Application No. 14738263.4.

* cited by examiner

Fig. 1

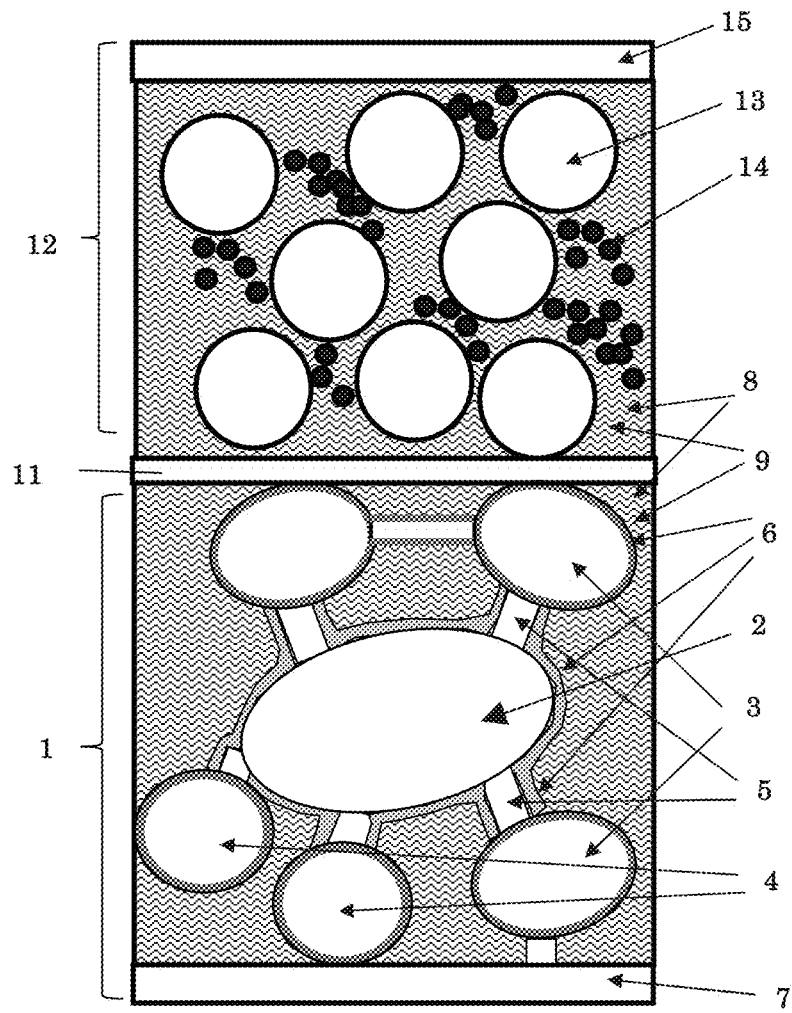

1 negative electrode
2 first carbon (spherical graphite)
3 second carbon A (massive non-graphitizable carbon)
4 second carbon B (massive artificial graphite)
5 electrical conduction aid (plate-like graphite)
7 negative electrode current collector
8 electrolytic solution
9 additive
11 separator
12 positive electrode
13 positive electrode active material
14 carbon black
15 positive electrode current collector

NEGATIVE ELECTRODE FOR LITHIUM ION SECONDARY BATTERY COMPRISING NEGATIVE ELECTRODE ACTIVE MATERIAL CONTAINING TWO CARBONS AND METHOD FOR MANUFACTURING LITHIUM ION SECONDARY BATTERY COMPRISING SAME

CROSS-REFERENCE TO RELATED PATENT APPLICATIONS

This application is a National Stage Entry of International Application No. PCT/JP2014/050377, filed Jan. 10, 2014, which claims priority from Japanese Patent Application No. 2013-004100, filed Jan. 11, 2013. The entire contents of the above-referenced applications are expressly incorporated herein by reference.

TECHNICAL FIELD

The present invention relates to a negative electrode for a lithium ion secondary battery and a lithium ion secondary battery using the negative electrode.

BACKGROUND ART

Lithium ion secondary batteries are currently expanding the use as power sources for electric vehicles (EVs), hybrid vehicles (HEVs), and plug-in hybrids (PHEVs), with increasing awareness of environmental issues on a worldwide scale. Furthermore, after the accident at the Fukushima Daiichi Nuclear Power Plant in March 2011, also lithium ion secondary batteries using large-sized laminated cells are expected to be widely used as large-sized storage batteries for large-sized electric power storage systems for business places and for electricity storage systems of next-generation smart houses etc. For large-sized lithium ion secondary batteries, the required lifetime characteristics are longer than for small-sized power sources for mobile phones and mobile devices. In particular, large-sized lithium ion secondary batteries for vehicles and for electricity storage systems are required to have lifetime characteristics of a long period of at least 15 years. Thus, the lithium ion secondary battery is required to, first, have a small rate of capacity degradation to the number of times of charging and discharging and further to have a battery characteristic that a rapid capacity degradation phenomenon, what is called a rapid fading phenomenon, does not occur during traveling or during the operation of the storage battery in order to enhance the safety of large-sized batteries etc.

Furthermore, these days, a technology is desired in which the resistance of the whole battery is made as low as possible so that the lithium battery can operate for a long period of time while lithium precipitation does not occur on the negative electrode surface during charging and discharging even in a high temperature environment. Thus, as the battery characteristics of the lithium ion secondary battery, it is desired that the resistance of the battery be small, receiving property during charging be good, and furthermore, the rate of capacity degradation to the number of times of charging and discharging be small, and cycle property be good.

In general, the lithium ion secondary battery is composed of a positive electrode, a negative electrode, an electrolyte, and a separator. As the positive electrode active material used for the positive electrode, mainly lithium cobaltate ($LiCoO_2$), manganese spinel ($LiMn_2O_4$), and the like are used. Since the positive electrode active material has a high electric resistance, a carbon-based electrical conduction aid is used to reduce the electric resistance of the positive electrode. Examples of the binder used include a polymer such as styrene-butadiene rubber, fluororubber, synthetic rubber, and polyvinylidene fluoride, an acrylic resin, and the like.

As the negative electrode active material, natural graphite, artificial graphite obtained by heat-treating coal, petroleum pitch, or the like at high temperature, amorphous carbon obtained by heat-treating coal, petroleum pitch coke, acetylene pitch coke, or the like, metal lithium, lithium alloy such as AlLi, etc. are used. A carbon-based electrical conduction aid may be used also for the negative electrode for the purpose of reducing the cell resistance.

For the electrolytic solution, a non-aqueous electrolytic solution in which an electrolyte such as a lithium salt is dissolved is used. As the lithium salt, $LiPF_6$, $LiBF_4$, a lithium imide salt, $LiClO_4$, and the like are used. The separator is formed of a film that separates the positive electrode and the negative electrode to prevent a short circuit between both electrodes.

Patent Literature 1 (Japanese Patent Laid-Open No. 2005-142004) discloses a technology in which an electrical conduction aid of carbon black is added in order to reduce the negative electrode resistance. Since carbon black is composed of primary particles of the order of several tens of nanometers, carbon black is likely to cohere and forms secondary particles to act as a bridge between active materials; thus, carbon black is effective to ensure electrical conductivity for charge and discharge cycles in the early period.

Patent Literature 2 discloses a technology in which, in a lithium ion battery using a negative electrode in which a plurality of negative electrode active materials such as natural graphite and artificial graphite are mixed, the surface of the graphite particle is covered with another carbon material. When such a mixture-type graphite negative electrode is used, a lithium battery with a relatively high capacity and high coulomb efficiency can be obtained. However, the technology has not yet satisfied requirements pertaining to a lithium ion secondary battery with high safety in which a precipitate containing metal lithium is not produced on the negative electrode surface.

Patent Literature 3 discloses a technology in which the proportion of graphite is 50 mass % or less and a coating film containing sulfur and nitrogen exists on the negative electrode surface. The technology including such a coating film is an effective means for suppressing battery expansion associated with the progress of cycles of the battery. However, the technology has not yet satisfied requirements of long-term charge and discharge characteristics without the occurrence of rapid fading.

Patent Literature 4 discloses a technology to obtain a stable coating film with high ion conductivity on the negative electrode surface by letting a sulfur compound to be present on the negative electrode surface and letting sulfur with no oxygen in the nearest neighbor for which a peak is seen at 162.9 to 164.0 eV in XPS analysis to be present. The technology has the action of suppressing the decomposition of the electrolytic solution, but leaves room for improvement in the safety of lithium ion secondary batteries using a graphite-based negative electrode as the main material.

Patent Literatures 5 and 6 disclose a technology of a non-aqueous electrolytic solution containing a cyclic disulfonic acid ester. However, there is great room for improvement in regard to high safety in which metal lithium precipitation does not occur even in the late period of discharging.

Patent Literature 7 discloses a battery technology in which spherized natural graphite particles and 3% flake-like graphite fine particles produced in China are mixed. However, also in the battery described in Patent Literature 7, there is room for improvement to achieve low resistance, high cycle property, and sufficient safety.

Patent Literature 8 discloses a lithium battery in which the amount of surface functional groups of carbon material used for the lithium ion battery, O/C, is 1% or more and 4% or less and the amount of surface functional groups, Cl/C+ $S_{165}/C$, is 0.05% or more and 0.5% or less; thus, gas production in the early period of cycles and during storage at high temperature is reduced. However, XPS is not suitable for the analysis of several thousand ppm or less of surface functional groups. Hence, a battery with good cycle property and high safety is not sufficiently studied.

CITATION LIST

Patent Literature

Patent Literature 1: Japanese Patent Laid-Open No. 2005-142004
Patent Literature 2: Japanese Patent No. 4738553
Patent Literature 3: Japanese Patent Laid-Open No. 2009-32575
Patent Literature 4: Japanese Patent No. 4844718
Patent Literature 5: Japanese Patent Laid-Open No. 2008-277004
Patent Literature 6: Japanese Patent Laid-Open No. 2012-94454
Patent Literature 7: Japanese Patent No. 3718072
Patent Literature 8: Japanese Patent Laid-Open No. 2010-219036

SUMMARY OF INVENTION

Technical Problem

In a lithium ion battery such as one described in Patent Literature 1 in which carbon black is used as an electrical conduction aid, there has been a case where, while the charge and discharge cycle is repeated, carbon black reacts with the electrolytic solution, and primary particles disappear due to gasification and further etching; thus, the electrically conductive network of secondary particles is divided. Consequently, there has been a case where a rapid increase in the resistance of the lithium ion battery occurs and rapid capacity degradation (rapid fading) is caused. In particular, in such a lithium battery in which capacity degradation is severe, there has been a problem that a precipitate containing metal Li may be produced on the surface of the negative electrode, resulting in a reduction in the safety of the battery.

Carbon black, which is commonly and widely used as electrical conduction aids, plays a role of enhancing electrical conductivity by adhering to the surface of an electrode active material and filling the space between active materials. Carbon black forms an electrically conductive network and keeps electrical conductivity in a state of secondary particles. However, a problem is that the size of the secondary particle of carbon black depends on the shearing force at the time of kneading in a slurry preparation process and the size of the secondary particle varies.

Consequently, in the negative electrode that uses carbon black as an electrically conductive material and has a non-uniform electrical conductivity distribution, the electrically conductive network filling the space between an active material and an active material often tends to break off in accordance with a volume expansion of approximately 11% associated with charge and discharge cycles. Then, the cell resistance increases and the decomposition of the electrolytic solution proceeds, for example, which causes abrupt rapid fading more easily.

Thus, in the lithium ion batteries described in the above cited literatures, there has been a problem in long-term lifetime characteristics and suppressing rapid capacity degradation. An object of the present invention is to provide a lithium ion battery having excellent long-term lifetime characteristics and excellent charge and discharge characteristics without the occurrence of rapid capacity degradation.

Solution to Problem

The embodiment relates to a negative electrode for a lithium ion secondary battery, the negative electrode containing a negative electrode active material containing a first carbon and a second carbon, in which
the first carbon is spherical graphite,
the second carbon is massive graphite, and
the sulfur concentration in the first carbon (Sx) and the sulfur concentration in the second carbon (Sy) are each independently 0 ppm or more and 300 ppm or less, a lithium ion secondary battery including the negative electrode, and a method for manufacturing them.

Advantageous Effect of Invention

According to the present invention, there is provided a lithium ion secondary battery which does not cause rapid capacity degradation (rapid fading) particularly during charging and discharging in a high temperature environment and is therefore excellent in safety.

BRIEF DESCRIPTION OF DRAWINGS

FIG. 1 is a schematic cross-sectional view for describing the structure of a lithium ion battery of an embodiment of the present invention.

DESCRIPTION OF EMBODIMENTS

Figure 2:
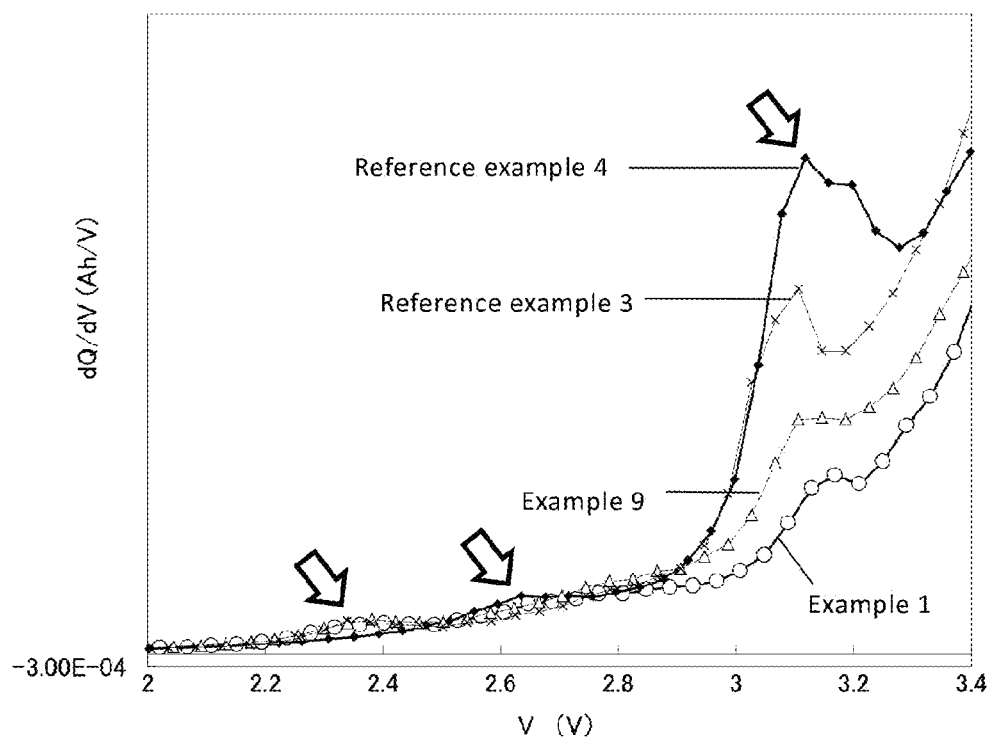
FIG. 2 is a diagram showing capacity change curves at cell voltages of 2.0 to 3.4 V of the batteries of Examples 1 and 9 and Reference Examples 3 and 4.

FIG. 1 shows an example of a schematic cross-sectional view for describing the structure of a lithium ion battery of the embodiment. In the lithium ion battery, a negative electrode 1 having a layer containing spherical natural graphite 2 (a first carbon), massive non-graphitizable carbon 3 (a second carbon A), and massive artificial graphite (a second carbon B) as negative electrode active materials and plate-like graphite 5 as an electrical conduction aid on a negative electrode current collector 7 and a positive electrode 12 having a layer containing a positive electrode active material 13 on a positive electrode current collector 15 are stacked via a separator 11. The separator 11 is immersed in an electrolytic solution 8. The electrolytic solution 8 contains an additive 9. By the additive 9 being contained, in the lithium secondary battery of FIG. 1, an SEI film is formed during the initial charging on the surfaces of the first carbon 2 and the second carbons 3 and 4, which are negative electrode active materials, and the electrical conduction aid 5.

<Negative Electrode>

In the present embodiment, the negative electrode contains a negative electrode active material containing a first carbon and a second carbon, wherein the first carbon is spherical graphite, the second carbon is massive graphite, and the sulfur concentration in the first carbon (Sx) and the sulfur concentration in the second carbon (Sy) are each independently 0 ppm or more and 300 ppm or less.

In a preferred aspect of the present embodiment, the negative electrode contains a negative electrode active material containing a first carbon and a second carbon, an electrical conduction aid, and a binder, wherein the first carbon is spherical graphite, the second carbon is massive non-graphitizable carbon and/or massive artificial graphite, the electrical conduction aid is plate-like graphite, and the sulfur concentration in the first carbon (Sx) and the sulfur concentration in the second carbon (Sy) are each independently 0 ppm or more and 300 ppm or less.

When the ratio between carboxyl group and phenol-type hydroxyl group that are surface functional groups of the first carbon (carboxyl group/phenol-type hydroxyl group) is denoted by GM(sf), GM(sf) may be 0.1 to 1.1; and when the ratio between carboxyl group and phenol-type hydroxyl group that are surface functional groups of the second carbon (carboxyl group/phenol-type hydroxyl group) is denoted by GV(sf), GV(sf) may be 0.1 to 1.1.

In the present specification, the description of "ppm" refers to "mass ppm." Sx, Sy, and Sz denote the sulfur concentrations in the first carbon, the second carbon, and the electrical conduction aid, respectively; and these represent the sulfur concentration before the charging of the lithium ion secondary battery. In the present specification, the "ratio between carboxyl group and phenol-type hydroxyl group" refers to "(the number of carboxyl groups)/(the number of phenol-type hydroxyl groups)".

(Negative Electrode Active Material)

In the embodiment, the negative electrode active material includes a negative electrode active material containing a first carbon and a second carbon, and the first carbon is spherical graphite and the second carbon is massive graphite.

In the embodiment, it is preferable that the negative electrode active material contain a first carbon and a second carbon, and the first carbon is spherical graphite and the second carbon is massive non-graphitizable carbon and/or massive artificial graphite.

In the present specification, one of the first carbon and the second carbon having larger content (mass) in the negative electrode active material may be referred to as the "main material," and another having smaller content (mass) may be referred to as the "secondary material."

The first carbon contained in the negative electrode active material is spherical graphite. "Spherical graphite" is produced using flake-like graphite as the source material and has a structure in which flake-like graphite is folded into a spherical form. Therefore, spherical graphite has a cabbage-like external appearance in which schistosity is observed and the schistosity is oriented in various directions. A space is observed in the cross section of spherical graphite. Because the first carbon contained in the negative electrode active material is in a spherical form, the orientation of the crystal is in various directions even after a rolling process in electrode fabrication. Therefore, it becomes easier for lithium ions to move between the electrodes smoothly. Furthermore, by using spherical graphite, a space suitable to retain the electrolytic solution can be obtained between negative electrode active materials; thus, a lithium secondary battery excellent in high power characteristics can be obtained.

The fact that the form of the first carbon contained in the negative electrode active material is a spherical form can be confirmed by SEM (scanning microscope) observation.

The negative electrode active material can be determined as in a spherical form if the schistosity mentioned above is observed and the ratio between the length in the minor axis direction (the length in the direction in which the length is shortest) and the length in the major axis direction (the length in the direction in which the length is longest) of the negative electrode active material, (minor axis)/(major axis), is larger than 0.2 in the SEM image. The (minor axis)/(major axis) of the first carbon of the negative electrode active material is preferably 0.3 or more, and more preferably 0.5 or more.

In the embodiment, the sulfur concentration in the first carbon (including the surface and inside of the first carbon) (Sx) is 0 ppm or more and 300 ppm or less, preferably 0 ppm or more and 250 ppm or less, and more preferably 0 ppm or more and 100 ppm or less. If the amount of sulfur components contained in the negative electrode active material in advance is too large, a highly resistive coating film is formed due to the sulfur components. But if Sx is in the range mentioned above, a good SEI film can be formed in the negative electrode.

The sulfur concentration in the first carbon can be measured by, for example, X-ray fluorescence analysis.

In the embodiment, when the ratio between carboxyl group and phenol-type hydroxyl group in surface functional groups of the first carbon, (carboxyl group/phenol-type hydroxyl group), is denoted by GM(sf), GM(sf) may be 0.1 to 1.1, and preferably 0.3 to 1.0. If GM(sf) is too large, the number of active points in the graphite surface becomes too large, and this is a factor in excessive side reactions with the electrolytic solution or gas production. On the other hand, if GM(sf) is too small, the number of active points becomes too small, and the effect of the additive in the electrolytic solution may be weakened.

The measurement of the surface functional groups of the first carbon can be carried out by, for example, the following neutralization titration method. 10 g of a sample is weighed out, and 30 ml of a 0.05 mol/L alkaline aqueous solution of NaOH (sodium hydroxide), $Na_2CO_3$ (sodium carbonate), and $NaHCO_3$ (sodium hydrogen carbonate) is added to the sample bottle. Then, stirring is performed in a glove box of a nitrogen atmosphere, the sample bottle is allowed to stand at room temperature to allow the sample to sink, and the supernatant liquid is subjected to neutralization titration with 0.05 mol/L hydrochloric acid. An automatic titration apparatus AT-410WIN may be used for the titration. The measurement is made on the assumption that the total amount of acidic functional groups is defined to be equivalent to the amount of sodium hydroxide consumed, the amount of strongly acidic carboxy is equivalent to the amount of sodium hydrogen carbonate, and the amount of phenol-type hydroxyl groups is equivalent to the amount obtained by subtracting the amount of sodium carbonate consumed from the amount of sodium hydroxide.

In the embodiment, the first carbon in the negative electrode active material may be either natural graphite or artificial graphite to the extent that it is spherical graphite that can absorb and desorb cations and has the features mentioned above for Sx and preferably GM(sf); but is preferably spherical natural graphite. One spherical graphite may be used alone, or two or more spherical graphites may be used in combination. Since spherical natural graphite can be produced in a large amount at low cost, its industrial applicability is particularly high with the spread and expansion of large-sized lithium battery uses. For natural graphite, because of the softness of its graphite particle, orientation in a specific direction becomes high due to roll pressing during electrode fabrication, as compared to artificial graphite; hence, it is feared that the characteristics of absorption and desorption of lithium ions are degraded. Thus, artificial graphite that requires heat treatment by graphitization has been used in many cases for negative electrodes for uses for which high performance is required; but in the embodiment, spherical natural graphite can be used as the main material because the second carbon and the electrical conduction aid described later are used in combination, and therefore the manufacturing costs can be reduced. Furthermore, spherical natural graphite can be expected to have the effect of suppressing orientation in a specific direction and deformation of particles. Thus, in the embodiment, it becomes possible for spherical natural graphite of low cost to be used for fields in which high performance and long lifetimes are required (e.g. for vehicles or for electricity storage systems).

In the embodiment, the spherical graphite of the first carbon may or may not be covered with amorphous carbon or the like on its surface.

When natural graphite or the like with its surface covered with amorphous carbon is used as the negative electrode active material, this is excellent in that the reactivity with the electrolytic solution is suppressed, but on the other hand an SEI film with a high charge transfer resistance may be formed due to sulfur components or surface functional groups contained in the carbon source used for surface coating. In natural graphite or the like with its surface covered with amorphous carbon, there is a case where hydrophilic surface functional groups such as phenol-type hydroxyl groups or carboxyl groups are produced in a large amount on the surface of the amorphous carbon. In this case, when the additive in the electrolytic solution reductively decomposes, water adsorbed on the hydrophilic group may decompose the additive and make it difficult to form a good SEI film. Furthermore, when the negative electrode is prepared to the design density by roll-pressing natural graphite covered with amorphous carbon or the like, the core material of the particle of natural graphite is very soft, whereas the surface layer of the coating layer of amorphous carbon is hard; thus, when the particle is deformed by pressing, the coating layer of amorphous carbon and the layer of the particle of natural graphite may be crushed non-uniformly. In this case, the SEI film becomes thick and non-uniform and a coating film in which resistance is partly high is formed; as a result, capacity degradation occurs. Thus, in the embodiment, there is a case where it is more preferable to use spherical natural graphite with its surface not covered with amorphous carbon as the negative electrode active material.

The properties of the graphite of the first carbon depend on the firing temperature and the type and pressure of the atmosphere gas in the time of production, such as in acid treatment in an impurity removal process of natural graphite of the source material, spherization processing from flake-like graphite, or subsequent carbonization treatment. Hence, the spherical graphite that is the first carbon of the embodiment can be produced by changing the production conditions of spherical graphite.

In the embodiment, the amount of the first carbon contained in the total mass of the negative electrode mixture (the total mass of the negative electrode active material, the electrical conduction aid, and the negative electrode binder) is preferably 50 mass % or more, more preferably 55 mass % or more, and still more preferably 60 mass % or more; and preferably 90 mass % or less, more preferably 87 mass % or less, and still more preferably 85 mass % or less.

In the embodiment, the second carbon contained in the negative electrode active material is massive graphite. The second carbon contained in the negative electrode active material may be massive non-graphitizable carbon and/or massive artificial graphite. Massive non-graphitizable carbon or massive artificial graphite has a homogeneous form in which schistosity is not observed.

Also the form of the second carbon contained in the negative electrode active material can be confirmed by SEM (scanning microscope) observation. When schistosity is not observed and the ratio between the length in the minor axis direction (the length in the direction in which the length is shortest) and the length in the major axis direction (the length in the direction in which the length is longest) of the second carbon, (minor axis)/(major axis), is larger than 0.2 in the SEM image of the second carbon, the carbon can be determined as in a massive form. The (minor axis)/(major axis) of the negative electrode active material is preferably 0.3 or more, and more preferably 0.5 or more.

In the negative electrode, because the massive second carbon is contained, a space is created between particles of the first carbon, the electrical conduction aid is dispersed in the space, and the electrolytic solution spreads equally; and when the electrolytic solution contains an additive, a good SEI film due to the additive is formed. Furthermore, non-graphitizable carbon and artificial graphite used as the second carbon are harder than natural graphite, and can therefore prevent the deformation of the first carbon during electrode pressing when natural graphite is used as the first carbon.

In the embodiment, the sulfur concentration in the second carbon (including the surface and inside of the second carbon) (Sy) is 0 ppm or more and 300 ppm or less, preferably 10 ppm or more and 250 ppm or less, and more preferably 10 ppm or more and 200 ppm or less. If Sy is in the range mentioned above, a good SEI film can be formed in the negative electrode.

In the embodiment, when the ratio between carboxyl group and phenol-type hydroxyl group of surface functional groups of the second carbon of the negative electrode active material (carboxyl group/phenol-type hydroxyl group) is denoted by GV(sf), GV(sf) may be 0.1 to 1.1. It is preferably 0.1 to 0.5. If GV(sf) is too large, the number of active points in the graphite surface becomes too large, and this is a factor in excessive side reactions with the electrolytic solution or gas production. On the other hand, if GV(sf) is too small, the number of active points becomes too small, and the effect of the additive in the electrolytic solution may be weakened.

The sulfur concentration in the second carbon and the ratio between carboxyl group and phenol-type hydroxyl group of surface functional groups of the second carbon (carboxyl group/phenol-type hydroxyl group) can be measured by the same method as the case of the first carbon mentioned above.

In the embodiment, as the second carbon, massive non-graphitizable carbon and massive artificial graphite may be used singly or in combinations of two or more.

The amount of the second carbon contained in the total mass of the negative electrode mixture (the total mass of the negative electrode active material, the electrical conduction aid, and the negative electrode binder) is preferably 5 mass % or more, more preferably 8 mass % or more, and still more preferably 10 mass % or more; and preferably 50 mass % or less, more preferably 40 mass % or less, and still more preferably 30 mass % or less. If the massive second carbon content is too small, the number of pieces of the second carbon interposed between pieces of the first carbon is not sufficient, and it is difficult to create a sufficient space in which plate-like graphite can be interposed, as described later. Consequently, there is a case where a sufficient electrically conductive network cannot be formed and the effect of improving electrical conductivity cannot be exhibited sufficiently. Furthermore, when the second carbon is used as the secondary material, if the second carbon content is too small, the effect of preventing the deformation of the main material during electrode pressing may be reduced. On the other hand, if the second carbon content is too large, the second carbon gets between negative electrode active materials of the first carbon more than necessary; consequently, the probability of overlapping of particles of the second carbon is increased, and it may be difficult to form a homogeneous SEI film on the first carbon.

Examples of the method for producing massive non-graphitizable carbon of the second carbon include a method in which petroleum pitch produced as a by-product during crude oil cracking, phenol resin, or the like is used and firing is performed at 1600 to 2600° C. Examples of the method for producing massive artificial graphite of the second carbon include a method in which, for example when coal pitch is used as a source material, coal pitch is mixed with petroleum pitch, coal tar pitch, or the like and firing is performed at 2000 to 3000° C.

In the embodiment, although not particularly limited, it is preferable that the first carbon is larger than the second carbon in the amount (mass) contained in the negative electrode active material, that is, the first carbon is the main material and the second carbon be the secondary material.

(Electrical Conduction Aid)

In the embodiment, the negative electrode preferably contains graphite having a plate-like form as an electrical conduction aid. Also the form of the electrical conduction aid can be confirmed by SEM (scanning microscope) observation. When the ratio of (minor axis; the length in the c-axis direction)/(major axis; the length in the a-axis direction) is 0.2 or less in the SEM image of the electrical conduction aid, it can be determined as in a plate-like form. The (minor axis; the length in the c-axis direction)/(major axis; the length in the a-axis direction) of the electrical conduction aid is preferably 0.1 or less, and more preferably 0.05 or less.

In the embodiment, the sulfur concentration in the electrical conduction aid (including the surface and inside of the electrical conduction aid) (Sz) is preferably 0 ppm or more and 300 ppm or less, and more preferably 10 ppm or more and 250 ppm or less. If Sz is in the range mentioned above, a good SEI film can be formed in the negative electrode.

In the embodiment, when the ratio between carboxyl group and phenol-type hydroxyl group of surface functional groups of the electrical conduction aid of the negative electrode active material (carboxyl group/phenol-type hydroxyl group) is denoted by GA(sf), GA(sf) is preferably 0.1 to 1.1, and more preferably 0.5 to 1.1. If GA(sf) is too large, the number of active points in the graphite surface becomes too large, and this is a factor in excessive side reactions with the electrolytic solution or gas production. On the other hand, if GA(sf) is too small, the number of active points becomes too small, and the effect of the additive in the electrolytic solution may be weakened.

The sulfur concentration in the electrical conduction aid and the ratio between carboxyl group and phenol-type hydroxyl group of surface functional groups of the electrical conduction aid (carboxyl group/phenol-type hydroxyl group) can be measured by the same method as the case of the first carbon mentioned above.

As shown in FIG. 1, it is preferable that part of the edge surface of the plate-like graphite electrical conduction aid 5 is in contact with the surface of the negative electrode active material 2 of spherical graphite or the surface of the non-graphitizable carbon 3 or the artificial graphite 4. Thereby, the electronic resistance of the negative electrode can be reduced and the lifetime characteristics of the battery can be significantly improved. In the plate-like graphite electrical conduction aid 5, the electric resistance in the a-axis direction of the graphite structure (the direction along the hexagonal net plane of carbon forming graphite; for plate-like graphite, the in-plane direction of the plate) is lower than the electric resistance in the c-axis direction (the thickness direction in which the hexagonal net planes of carbon forming graphite are stacked; for plate-like graphite, the direction perpendicular to the plate) by approximately three orders, and electrical conductivity is very good in the a-axis direction. Therefore, the resistance of the negative electrode can be reduced most effectively when both end surfaces (edge surfaces) of the plate-like graphite electrical conduction aid are kept in contact with the surfaces of negative electrode active materials as shown in FIG. 1.

When 50 electrical conduction aids are observed in the SEM image of the negative electrode and it is found that part of the end in the major axis direction of an electrical conduction aid is in contact with the surface of a negative electrode active material, it can be determined that "part of the edge surface of the electrical conduction aid is in contact with the surface of the negative electrode active material." In the embodiment, in a preferred aspect, when 30 electrical conduction aids are observed, part of the end in the major axis direction of an electrical conduction aid is in contact with the surface of a negative electrode active material; and in a more preferred aspect, when 10 electrical conduction aids are observed, part of the end in the major axis direction of an electrical conduction aid is in contact with the surface of a negative electrode active material.

When the plate-like electrical conduction aid is in contact with, via its edge surface, the negative electrode active material, the SEI film of the contact portion is less likely to be broken during charge and discharge cycles. This is presumed to be because, when the additive is reductively decomposed, a good-quality SEI film is formed also on the surface of the negative electrode active material through the contact portion of the negative electrode active material or the plate-like graphite aid and thereby a strong bond is formed. When a low resistive SEI film is favorably produced in this way, since the SEI film is maintained even in the repetition of charging and discharging, the lifetime characteristics of the lithium ion battery can be significantly improved.

The amount of the plate-like graphite electrical conduction aid contained in the total mass of the negative electrode mixture (the total mass of the negative electrode active material, the electrical conduction aid, and the negative electrode binder) is preferably 2.0 mass % or more and 10 mass % or less. If the plate-like graphite electrical conduction aid content is smaller than 2.0 mass %, there is a case where the number of electrical conduction aids interposed between the main material and the secondary material is not sufficient, and a sufficient electrically conductive network cannot be formed and the effect of improving electrical conductivity cannot be exhibited sufficiently. On the other hand, if the amount of the electrical conduction aid is too large, the electrical conduction aid gets between the main material and the secondary material more than necessary and a space is created; consequently, the initial cell thickness of the lithium ion battery may be increased. In particular, for lithium ion batteries for vehicles, since a plurality of lithium ion batteries are arranged to be stacked in a limited housing space, it is considered to be necessary that the increase in cell thickness due to the addition of the electrical conduction aid should be 10% or less, in terms of design. Thus, the rate of increase in cell thickness may be made 10% or less by setting the content to 10 mass % or less.

The thickness of the plate-like graphite electrical conduction aid is preferably 0.01 μm or more, and more preferably 0.05 μm or more; and preferably 0.5 μm or less. If the thickness of the plate-like graphite electrical conduction aid is larger than 0.5 μm, there is a case where the area of the edge surface of the graphite of the plate-like graphite electrical conduction aid is increased; consequently, side reactions with the electrolytic solution become great and the space that enhances the permeability of the electrolytic solution is closed. On the other hand, if the thickness of the plate-like graphite electrical conduction aid is smaller than 0.01 μm, there is a case where the mechanical strength for pressing during electrode fabrication cannot be kept. The thickness of the plate-like graphite electrical conduction aid can be calculated as the average thickness of 100 plate-like graphite electrical conduction aids by performing SEM (scanning microscope) observation on them.

The specific surface area of the plate-like graphite electrical conduction aid is preferably 8 m$^2$/g or more and 40 m$^2$/g or less. If the specific surface area is more than 40 m$^2$/g, the lifetime characteristics of the battery may be degraded because side reactions with the electrolytic solution becomes large and gas is produced. On the other hand, if the specific surface area is less than 8 m$^2$/g, there is a case where the particle size of the plate-like graphite electrical conduction aid is increased and a contact cannot be made in the space between negative electrode active materials with good efficiency. For electrical conduction aids according to related art, for example, the specific surface area of Ketjen black is 800 m$^2$/g to 1300 m$^2$/g, which is one order larger than that of plate-like graphite used for the embodiment, and the specific surface areas of acetylene black and carbon black are in the range of 50 m$^2$/g to 100 m$^2$/g. Hence, in general, the specific surface areas of electrical conduction aids of related art are twice to four times larger than the specific surface area of the plate-like graphite electrical conduction aid of the present invention. Thus, the plate-like graphite electrical conduction aid used for the present invention has a relatively small specific surface area and has a particle form of a plate-like form, and therefore has very good characteristics as the electrical conduction aid. The specific surface area of the plate-like graphite electrical conduction aid can be measured by the BET method.

The negative electrode active material of graphite contributes to the charging and discharging of the lithium ion secondary battery, and has a specific surface area of preferably 0.5 m$^2$/g or more and 8 m$^2$/g or less, and more preferably 0.5 m$^2$/g or more and less than 8 m$^2$/g; whereas the electrical conduction aid of graphite differs in that it increases the electrical conductivity in the negative electrode and has a specific surface area of 8 m$^2$/g or more.

The plate-like graphite electrical conduction aid is preferably artificial graphite in which crystallinity has developed moderately, but is not limited to this. Also natural graphite-based materials are preferable to the extent that they have crystallinity substantially equal to that of artificial graphite. The crystallinity of the surface of the electrical conduction aid can be evaluated by Raman spectroscopy. As the Raman band of graphite, the G band (around 1580 to 1600 cm$^{-1}$) corresponding to the in-plane vibration mode and the D band (around 1360 cm$^{-1}$) derived from the defect in the plane are observed. When the peak intensities of these are denoted by $I_G$ and $I_D$, respectively, the peak intensity ratio $I_G/I_D$ being higher means that the degree of graphitization is higher. For the Raman spectroscopy characteristics of the plate-like graphite electrical conduction aid, $I_G/I_D$ is preferably 2 or more and 10 or less. This Raman peak intensity ratio is larger than the peak intensity ratio $I_G/I_D$ of carbon black (=1.0). If $I_G/I_D$ is a value smaller than 2, the effect of forming a coating film of the electrode surface by the additive may be degraded; and if $I_G/I_D$ is larger than 10, the reactivity with the electrolytic solution may be increased and the lifetime characteristics may be degraded.

The properties of the plate-like graphite electrical conduction aid depend on the firing temperature and the type and pressure of the atmosphere gas in the time of production, and various plate-like graphite electrical conduction aids can be produced separately by changing the production conditions. When the source material is natural graphite, acid treatment in an impurity removal process and a process of pulverizing flake-like graphite into a plate-like form are necessary. For artificial graphite, when coal pitch is used as a source material, a method in which coal pitch is mixed with petroleum pitch, coal tar pitch, or the like and the particles are crushed and adjusted in particle size, and then firing is performed at 2000 to 3000° C. is given.

In the negative electrode of the embodiment, the first carbon, which is spherical graphite, the second carbon, which is massive non-graphitizable carbon and/or massive artificial graphite, and plate-like graphite as the electrical conduction aid are used; thus, since the forms of the particles of these are different, the massive second carbon and the plate-like electrical conduction aid are dispersed in the spaces between spherical graphite particles. Thereby, a structure in which a moderate space is maintained, the flow path of the electrolytic solution is ensured, and the electrical conductivity of particles is ensured is obtained. The electron conductivity between pieces of spherical graphite that is the first carbon, between the first carbon and the second carbon, between the first carbon and the current collector, and between the second carbon and the current collector can be improved. Furthermore, it becomes possible for the additive added into the electrolytic solution to react uniformly and equally in the negative electrode, and a low resistive good-quality SEI film can be formed. Therefore, the lithium ion battery of the embodiment can suppress the increase in electronic resistance and greatly improve the lifetime characteristics.

Furthermore, the sulfur concentration in the first carbon (Sx) and the sulfur concentration in the second carbon (Sy) are each independently 0 ppm or more and 300 ppm or less and the sulfur concentration in the electrical conduction aid (Sz) is preferably 0 ppm or more and 300 ppm or less; thereby, a coating film in which resistance is locally high due to sulfur components remaining on the electrode surface is not formed, and a homogeneous, low resistive, thin, good-quality SEI film can be formed.

Furthermore, when the ratios between carboxyl group and phenol-type hydroxyl group that are surface functional groups of the first carbon, the second carbon, and the electrical conduction aid (carboxyl group/phenol-type hydroxyl group) are denoted by GM(sf), GV(sf), and GA(sf), respectively, GM(sf) and GV(sf) are each independently 0.1 to 1.1 and GA(sf) is preferably 0.1 to 1.1; thereby, degradation caused by reactions between water of the additive and surface functional groups is less likely to occur, and a good-quality SEI film can be formed.

In the embodiment, it is more preferable that the sulfur concentration in one of the first carbon and the second carbon which is contained in the negative electrode active material in the larger amount is 100 ppm or less, and it is still more preferable that the sulfur concentrations in both the first carbon and the second carbon be 100 ppm or less.

In the embodiment, it is more preferable that Sx, Sy, and Sz mentioned above satisfy at least one of the relations of $$Sx/Sy<3,$$

$$Sx/Sz<3, \text{ and}$$

$$Sy/Sz<3.$$

If these ratios are too large, an SEI film in which resistance is locally high may be produced. Hence, if Sx, Sy, and Sz satisfy the above relations, the occurrence of a spotted non-uniform SEI film due to the additive added to the electrolytic solution can be prevented, and the charge transfer resistance can be made smaller.

The average particle size $D_{50m}$ of the first carbon is not particularly limited, but is preferably, for example, 5 to 80 µm; the average particle size $D_{50v}$ of the second carbon is preferably, for example, 5 to 40 µm; and the average particle size $D_{50a}$ of the electrical conduction aid is preferably, for example, 2 to 20 µm.

Conventional electrical conduction aids such as carbon black and Ketjen black having the primary particle size of the order of several tens of nanometers have high cohesiveness, and have had problems that they are likely to form a gel due to an increase in slurry viscosity during electrode fabrication and are difficult to disperse uniformly between negative electrode active materials. Consequently, although there is electrical conductivity in a portion where electrical conduction aids have cohered, electrical conductivity is poor in other portions, causing unevenness in the electrically conductive network. Furthermore, for the electrically conductive network formed by the cohesion of such very small primary particles, although it is effective to ensure electrical conductivity in the early period of cycles, there has been a case where, while the charge and discharge cycle is repeated, the electrically conductive network reacts with the electrolytic solution and primary particles turn into a gas due to oxidation, the electrically conductive network of secondary particles is divided due to etching, and a rapid resistance increase occurs. Consequently, charging cannot be performed and capacity reduction occurs. Furthermore, small particles of carbon black or the like may, in a state of cohesion, fill the space between negative electrode active materials, and this has been a factor in inhibiting the permeability of the electrolytic solution.

On the other hand, in the embodiment, massive non-graphitizable carbon and massive artificial graphite that are the second carbon of the negative electrode active material and the plate-like graphite electrical conduction aid have moderate average particle sizes. Since they have excellent uniform dispersibility during slurry preparation and the electrically conductive network is hardly divided even during charge and discharge cycles, a rapid resistance increase and capacity reduction are suppressed. Furthermore, as mentioned above, a moderate space can be created between negative electrode active materials by using the plate-like graphite electrical conduction aid. Thereby, a flow path of the electrolytic solution is formed easily to facilitate the movement of lithium ions, and further, the space is also function as a liquid pool for the electrolytic solution; thus, the drying up of the electrolytic solution during charge and discharge cycles can be suppressed and rapid capacity degradation can be suppressed.

The ratio between the average particle size $D_{50m}$ of the first carbon and the average particle size $D_{50v}$ of the second carbon of the negative electrode active material, $D_{50m}/D_{50v}$, is preferably 1 or more and 8 or less, more preferably 1 or more and 6 or less, and still more preferably 1.5 or more and 3 or less. When $D_{50m}/D_{50v}$ is in the range, the characteristics of the lithium ion battery can be significantly improved.

The ratio between the average particle size $D_{50m}$ of the first carbon of the negative electrode active material and the average particle size $D_{50a}$ of the plate-like graphite electrical conduction aid, $D_{50m}/D_{50a}$, is preferably 1 or more and 11 or less, more preferably 1 or more and 10 or less, and still more preferably 2 or more and 5 or less. When $D_{50m}/D_{50a}$ is in the range, the characteristics of the lithium ion battery can be significantly improved.

If $D_{50m}/D_{50v}$ is less than 1, that is, if the average particle size of the second carbon is relatively large, the space between the first carbon and the second carbon is too small, and therefore the edge surfaces of the plate-like electrically conductive material less likely tend to contact the negative electrode active material. That is, such a state is likely to occur that particles of the negative electrode active material are separated by the upper and lower basal planes of the plate-like graphite electrical conduction aid. If $D_{50m}/D_{50v}$ is too large, that is, if the average particle size of the second carbon is relatively small, the space between the first carbon and the second carbon becomes too large, and there is a tendency for the electrical conduction aid to be in contact with the particle of the negative electrode active material via the basal plane. In such a state, since it is difficult for the plate-like graphite electrical conduction aid to connect negative electrode active materials via the edge surfaces, not only is the effect of improving electrical conductivity reduced, but the absorption and desorption of lithium ions to/from negative electrode active material particles are also inhibited.

To bring part of the edge surface of the plate-like graphite electrical conduction aid into contact with the negative electrode active material, it is preferable to select an plate-like graphite electrical conduction aid with a size substantially equal to the size of the space between negative electrode active materials, and $D_{50m}/D_{50a}$ is preferably in the range mentioned above. When such an average particle size ratio is satisfied, significant improvement in battery characteristics like that described above becomes possible.

The average particle size $D_{50m}$ of the first carbon, the average particle size $D_{50v}$ of the second carbon, and the average particle size $D_{50a}$ of the plate-like graphite electrical conduction aid were found from particle size distribution measurement on a volumetric basis using a particle size and particle size distribution apparatus of a laser diffraction and scattering system that detects the particle size from laser light scattering.

In the embodiment, the negative electrode may contain a negative electrode active material other than the first carbon and the second carbon mentioned above and an electrical conduction aid other than plate-like graphite (e.g. carbon black etc.).

Copper foil or the like may be used as the negative electrode current collector 7.

<Positive Electrode>

The positive electrode active material 13 is not particularly limited to the extent that it is one that absorbs cations during discharging. A metal oxide such as a lithium-transition metal composite oxide, for example, a lithium-cobalt composite oxide ($LiCoO_2$, $LiCoAlO_2$, $LiCoMnO_2$, etc.), a lithium-nickel composite oxide ($LiNiO_2$, $LiNiCoO_2$, $LiNiMnO_2$, $LiNiCoMnO_2$, etc.), a lithium-manganese composite oxide ($LiMnO_2$, $LiMn_2O_4$, $LiMnMgO_4$, $Li_2MnO_3$, etc.), and an olivine-type phosphate ($LiFePO_4$ etc.) may be used. Aluminum foil or the like may be used as the positive electrode current collector 15.

<Binder>

The binder is used in a layer containing the negative electrode active material in the negative electrode 1, and may be used in a layer containing the positive electrode active material in the positive electrode 12 in some cases. For example, in the negative electrode 1 in FIG. 1, the binder binds particles of the first carbon 2 and the second carbon (3, 4) of the negative electrode active material together, the negative electrode active material and the electrical conduction aid 5, and the negative electrode active material and the negative electrode current collector 7. The binder is not particularly limited, but polyvinylidene fluoride (PVDF), styrene-butadiene rubber (SBR), an acrylic-based polymer, and the like are suitable. When an organic-based binder is used, N-methyl-2-pyrrolidone (NMP) is most suitable as the solvent.

In an SBR-based water-based binder, ion-exchanged water is mainly used as the solvent, and a thickener such as carboxymethyl cellulose (CMC) may be used in combination. If the amount of the binder is too small, a sufficient binding strength (peel strength) is not obtained; and if the amount of the binder is too large, since the binder inhibits the free entry and exit of lithium ions, the charge transfer resistance is increased and the battery capacity is reduced. The proportion of the binder to the negative electrode mixture is preferably 1 mass % to 10 mass %, and more preferably 2 mass % to 5 mass %.

<Non-Aqueous Electrolyte Solvent>

As the solvent for the electrolytic solution 8, at least one organic solvent selected from organic solvents of cyclic carbonates, linear carbonates, aliphatic carboxylic acid esters, γ-lactones, cyclic ethers, linear ethers, and fluorinated derivatives of these may be used.

More specifically, one of the following may be used, or two or more thereof may be used as a mixture.

Cyclic carbonates: propylene carbonate (PC), ethylene carbonate (EC), butylene carbonate (BC), and derivatives of these Linear carbonates: dimethyl carbonate (DMC), diethyl carbonate (DEC), ethyl methyl carbonate (EMC), dipropyl carbonate (DPC), and derivatives of these Aliphatic carboxylic acid esters: methyl formate, methyl acetate, ethyl propionate, and derivatives of these γ-Lactones: γ-butyrolactone and derivatives of this Cyclic ethers: tetrahydrofuran, 2-methyltetrahydrofuran, and derivatives of these Linear ethers: 1,2-diethoxyethane (DEE), ethoxymethoxyethane (EME), diethyl ether, and derivatives of these Others: dimethyl sulfoxide, 1,3-dioxolane, formamide, acetamide, dimethylformamide, acetonitrile, propionitrile, nitromethane, ethyl monoglyme, a phosphoric acid triester, trimethoxymethane, a dioxolane derivative, methylsulfolane, 1,3-dimethyl-2-imidazolidinone, 3-methyl-2-oxazolidinone, anisole, N-methylpyrrolidone, and a fluorinated carboxylic acid ester.

In the solvent, a salt containing a cation of an alkali metal such as Li, K, and Na and an anion of a halogen-containing compound such as $ClO_4^-$, $BF_4^-$, $PF_6^-$, $CF_3SO_3^-$, $(CF_3SO_2)_2N^-$, $(C_2F_5SO_2)_2N^-$, $(CF_3SO_2)_3C^-$, and $(C_2F_5SO_2)_3C^-$ may be dissolved. Solvents made of basic solvents of them or electrolyte salts of them may be used singly or in combinations of two or more. It is also possible to use a gel-like electrolyte in which a polymer gel is impregnated with an electrolytic solution.

The electrolytic solution preferably further contains an additive that reductively decomposes at a voltage lower than the reduction voltage of the solvent. The additive reductively decomposes earlier than the solvent during charging and discharging and forms a good-quality SEI film on the negative electrode surface. Even when charging and discharging are repeated, the SEI film can be stably maintained on the negative electrode surface. The SEI film plays the roles of suppressing the decomposition reaction of the electrolytic solution on the negative electrode surface, allowing the desolvation reaction associated with the absorption and desorption of the lithium ion battery, and suppressing the physical structure degradation of the negative electrode active material.

As the additive, a cyclic sulfonic acid ester represented by general formula (1) below having two sulfonyl groups is preferably used,

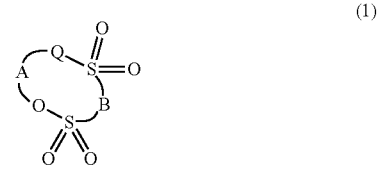

(1)

wherein Q represents an oxygen atom, methylene group, or a single bond, A represents substituted or unsubstituted alkylene group having 1 to 5 carbon atoms, carbonyl group, sulfinyl group, substituted or unsubstituted fluoroalkylene group having 1 to 6 carbon atoms, or divalent group having 2 to 6 carbon atoms in which alkylene units or fluoroalkylene units are bonded via an ether bond, and B represents substituted or unsubstituted alkylene group, substituted or unsubstituted fluoroalkylene group, or an oxygen atom.

In the compounds represented by general formula (1) above, A is preferably alkylene group having 1 to 5 carbon atoms, fluoroalkylene group having 1 to 5 carbon atoms, or divalent group having 2 to 6 carbon atoms in which alkylene units or fluoroalkylene units are bonded via an ether bond from the viewpoints of the stability of the compound, the easiness of synthesis of the compound, the solubility to the solvent, costs, etc. B is preferably alkylene group having 1 to 5 carbon atoms for the same reason.

As the additive, also a linear sulfonic acid ester represented by general formula (2) below having two sulfonyl groups may be used,

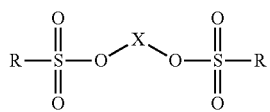
(2)

wherein X represents alkylene group having 1 to 6 carbon atoms, R represents alkyl group having 1 to 6 carbon atoms, and the two R are either the same group or different groups.

When ethylene carbonate, propylene carbonate, dimethyl carbonate, diethyl carbonate, or methyl ethyl carbonate is used as the solvent, examples of the additive that reductively decomposes at a voltage lower than the reduction voltage of the solvent include vinylene carbonate (VC), propanesultone (PS), fluoroethylene carbonate (FEC), and the compounds represented by formulae (3) to (25) below, but are not limited to these.

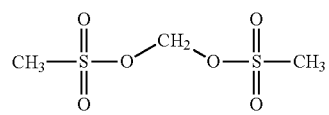
(3)

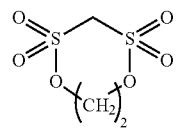
(4)

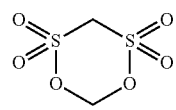
(5)

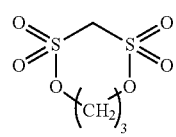
(6)

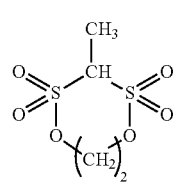
(7)

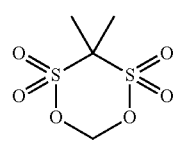
(8)

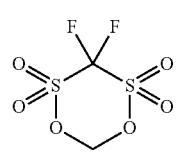
(9)

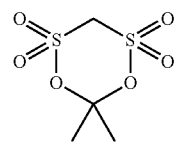
(10)

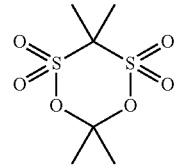
(11)

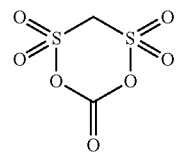
(12)

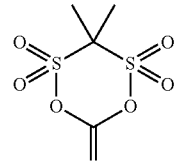
(13)

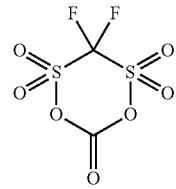
(14)

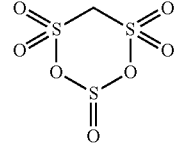
(15)

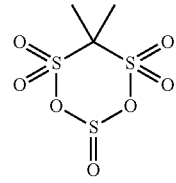
(16)

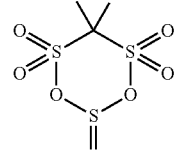
(17)

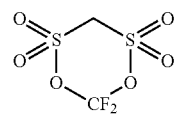
(18)

-continued

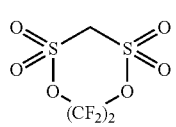
(19)

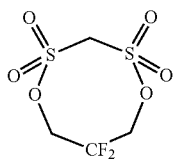
(20)

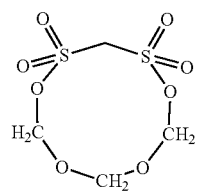
(21)

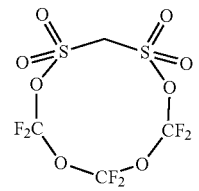
(22)

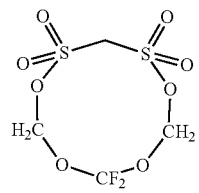
(23)

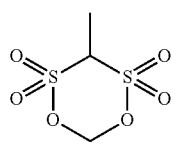
(24)

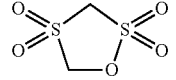
(25)

The amount of the additive contained in the electrolytic solution is not particularly limited, but the additive is contained in the electrolytic solution at preferably 0.5 mass % or more and 7 mass % or less, and more preferably 0.5 mass % or more and 5 mass % or less. If the amount is less than 0.5 mass %, an effect sufficient to form a coating film by an electrochemical reaction on the electrode surface may not be exhibited. If the additive content is too large, the viscosity of the electrolytic solution may be increased.

EXAMPLES

Hereinbelow, the present invention will be described with Examples, but the present invention is not limited to the Examples. In the following Examples, reference examples, and Comparative Examples, one of the first carbon and the second carbon of the negative electrode active material having larger content (mass) may be referred to as the "main material," and another having smaller content (mass) may be referred to as the "secondary material."

Example 1

Manufacturing of the Positive Electrode 92 parts by mass of manganese spinel ($LiMn_2O_4$) powder with an average particle size of 10 μm as the positive electrode active material, 4 parts by mass of a binder, and 4 parts by mass of carbon black as the electrical conduction aid were dispersed uniformly in NMP to prepare a slurry for the positive electrode. PVDF was used as the binder.

The reason why carbon black was used as the electrical conduction aid of the positive electrode is that in the positive electrode there is little volume expansion and shrinkage caused by the repetition of charging and discharging, which is observed in the negative electrode, and there is a difference between the electric potentials. In addition, it is because there is no disappearance (gasification) of primary particles and there is no breaking off of the electrically conductive network, which is seen in the negative electrode.

The positive electrode was fabricated by uniformly applying the slurry for the positive electrode to aluminum foil with a thickness of 20 μm as the positive electrode current collector using a coater and then vaporizing the NMP. After the one surface was dried, and the same process was repeated to the back surface to form a positive electrode that is a both-surface coated electrode. After drying, the density of the positive electrode was adjusted by roll pressing. The amount of the positive electrode mixture per unit area was 48 mg/cm².

<Manufacturing of the Negative Electrode>

10 parts by mass of massive non-graphitizable carbon A [average particle size (volumetric basis) $D_{50v}$=11 μm, specific surface area=5.5 m²/g, G/D ratio by Raman spectroscopy ($I_G/I_D$)=1.0] as the secondary material, 3 parts by mass of plate-like graphite a [average particle size (volumetric basis) $D_{50a}$=3 μm, average plate thickness=0.1 μm, specific surface area=15 m²/g, G/D ratio by Raman spectroscopy ($I_G/I_D$)=2.8] as the electrical conduction aid, 6 parts by mass of a binder, and 81 parts by mass of spherical natural graphite A (average particle size $D_{50m}$=20 μm) as the main material were added into NMP to prepare a slurry for the negative electrode. PVDF was used as the binder. The negative electrode was fabricated by uniformly applying the slurry for the negative electrode to copper foil with a thickness of 10 μm as the negative electrode current collector using a coater and then vaporizing the NMP. After drying, the density of the negative electrode was adjusted by roll pressing. The amount of the negative electrode mixture after drying was set to 10 mg/cm². The composition in the negative electrode mixture was 10 mass % massive non-graphitizable carbon A, 3 mass % plate-like graphite a, 6 mass % PVDF, and 81 mass % spherical natural graphite A. As the main material, spherical natural graphite A in which the sulfur concentration is 0 ppm and the ratio GM between carboxyl group and phenol-type hydroxyl group of acidic surface functional groups is 0.5 was used. As the secondary material, non-graphitizable carbon A in which the sulfur concentration is 30 ppm and the ratio GV between carboxyl group and phenol-type hydroxyl group=0.2 was used. As the electrical conduction aid, plate-like graphite a in which the sulfur concentration is 30 ppm and the ratio GA between carboxyl group and phenol-type hydroxyl group=0.6 was used. The sulfur concentrations of the main material, the secondary material, and the electrically conductive material were measured using X-ray fluorescence analysis (ZSX Primus II manufactured by Rigaku Corporation).

The ratio between the average particle size $D_{50m}$ of spherical natural graphite A and the average particle size $D_{50v}$ of massive non-graphitizable carbon A, $D_{50m}/D_{50v}$, was 1.8, and the ratio between the average particle size $D_{50m}$ of spherical natural graphite A and the average particle size $D_{50a}$ of plate-like graphite a (the electrical conduction aid), $D_{50m}/D_{50a}$, was 6.7. $D_{50m}$, $D_{50v}$, and $D_{50a}$ were measured with a laser diffraction particle size distribution measuring apparatus.

As the electrolytic solution, a solution in which $LiPF_6$ at 1 mol/L was dissolved as the electrolyte in ethylene carbonate (EC):diethyl carbonate (DEC)=40:60 (volume %) as the solvent and the cyclic disulfonic acid ester of formula (4) below at 2.0 mass % was mixed as the additive was used. The cyclic disulfonic acid ester reductively decomposes at a voltage lower than the reduction voltage of EC and DEC that are the solvent.

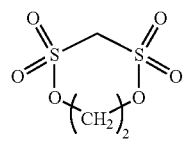
(4)

Next, a battery of a middle-sized laminated cell was fabricated. A method for fabricating a middle-sized laminated cell will now be described. The positive electrode described above was cut into 8.0 cm×4.8 cm, and the negative electrode into 9.0 cm×5.6 cm. Of these, 8.0 cm×1.0 cm of one side of the positive electrode and 9.0 cm×1.0 cm of one side of the negative electrode were left as uncoated portions for connecting tabs. A positive electrode tab made of aluminum with a width of 7 mm, a length of 12 cm, and a thickness of 0.1 mm was welded to the uncoated portion of the positive electrode. For the negative electrode, similarly a negative electrode tab made of nickel of the same shape was welded to the uncoated portion of the negative electrode. For the separator, polypropylene of 10 cm×7.0 cm was used. The separators covered both surfaces of the positive electrode, and the negative electrodes were disposed so as to face the positive electrode via both surfaces of the separators; thus, an electrode laminate was fabricated.

Next, the electrode laminate was sandwiched by two aluminum laminated films of 16 cm×10 cm, the three sides except one long side were thermally sealed with a width of 8 mm, the electrolytic solution was injected, and then the remaining one side was thermally sealed; thus, a battery of a middle-sized laminated cell was fabricated.

Example 2

The composition of the negative electrode mixture used herein was 81 mass % spherical natural graphite B (average particle size $D_{50m}$=20 μm) as the main material in which the sulfur concentration is 30 ppm and the ratio GM between carboxyl group and phenol-type hydroxyl group=0.5, 10 mass % massive non-graphitizable carbon A as the secondary material in which the sulfur concentration is 30 ppm and the ratio GV between carboxyl group and phenol-type hydroxyl group=0.2, 3 mass % plate-like graphite a as the electrical conduction aid in which the sulfur concentration is 30 ppm and the ratio GA between carboxyl group and phenol-type hydroxyl group=0.6, and 6 mass % PVDF. Except these, a battery was fabricated in the same manner as Example 1.

Example 3

The composition of the negative electrode mixture used herein was 81 mass % spherical natural graphite C (average particle size $D_{50m}$=20 μm) as the main material in which the sulfur concentration is 160 ppm and the ratio GM between carboxyl group and phenol-type hydroxyl group=0.5, 10 mass % massive non-graphitizable carbon A (average particle size $D_{50v}$=11 μm) as the secondary material in which the sulfur concentration is 30 ppm and the ratio GV between carboxyl group and phenol-type hydroxyl group=0.2, 3 mass % plate-like graphite a as the electrical conduction aid in which the sulfur concentration is 30 ppm and the ratio GA between carboxyl group and phenol-type hydroxyl group=0.6, and 6 mass % PVDF. Except these, a battery was fabricated in the same manner as Example 1.

Example 4

The composition of the negative electrode mixture used herein was 81 mass % spherical natural graphite D (average particle size $D_{50m}$=20 μm) as the main material in which the sulfur concentration is 230 ppm and the ratio GM between carboxyl group and phenol-type hydroxyl group=0.5, 10 mass % massive non-graphitizable carbon A (average particle size $D_{50v}$=11 μm) as the secondary material in which the sulfur concentration is 30 ppm and the ratio GV between carboxyl group and phenol-type hydroxyl group=0.2, 3 mass % plate-like graphite a as the electrical conduction aid in which the sulfur concentration is 30 ppm and the ratio GA between carboxyl group and phenol-type hydroxyl group=0.6, and 6 mass % PVDF. Except these, a battery was fabricated in the same manner as Example 1.

Example 5

The composition of the negative electrode mixture used herein was 81 mass % spherical natural graphite B (average particle size $D_{50m}$=20 μm) as the main material in which the sulfur concentration is 30 ppm and the ratio GM between carboxyl group and phenol-type hydroxyl group=0.5, 10 mass % massive non-graphitizable carbon B (average particle size $D_{50v}$=11 μm) as the secondary material in which the sulfur concentration is 100 ppm and the ratio GV between carboxyl group and phenol-type hydroxyl group=0.3, 3 mass % plate-like graphite a as the electrical conduction aid in which the sulfur concentration is 30 ppm and the ratio GA between carboxyl group and phenol-type hydroxyl group=0.6, and 6 mass % PVDF. Except these, a battery was fabricated in the same manner as Example 1.

Example 6

The composition of the negative electrode mixture used herein was 81 mass % spherical natural graphite B as the main material in which the sulfur concentration is 30 ppm and the ratio GM between carboxyl group and phenol-type hydroxyl group=0.5, 10 mass % massive non-graphitizable carbon C (average particle size $D_{50v}$=11 μm) as the secondary material in which the sulfur concentration is 200 ppm and the ratio GV between carboxyl group and phenol-type hydroxyl group=0.6, 3 mass % plate-like graphite a as the electrical conduction aid in which the sulfur concentration is 30 ppm and the ratio GA between carboxyl group and phenol-type hydroxyl group=0.6, and 6 mass % PVDF. Except these, a battery was fabricated in the same manner as Example 1.

Example 7

The composition of the negative electrode mixture used herein was 81 mass % spherical natural graphite B (average particle size $D_{50m}=20$ μm) as the main material in which the sulfur concentration is 30 ppm and the ratio GM between carboxyl group and phenol-type hydroxyl group=0.5, 10 mass % massive non-graphitizable carbon A (average particle size $D_{50v}=11$ μm) as the secondary material in which the sulfur concentration is 30 ppm and the ratio GV between carboxyl group and phenol-type hydroxyl group=0.2, 3 mass % plate-like graphite b as the electrical conduction aid in which the sulfur concentration is 100 ppm and the ratio GA between carboxyl group and phenol-type hydroxyl group=0.7, and 6 mass % PVDF. Except these, a battery was fabricated in the same manner as Example 1.

Example 8

The composition of the negative electrode mixture used herein was 81 mass % spherical natural graphite B (average particle size $D_{50m}=20$ μm) as the main material in which the sulfur concentration is 30 ppm and the ratio GM between carboxyl group and phenol-type hydroxyl group=0.5, 10 mass % massive non-graphitizable carbon A (average particle size $D_{50v}=11$ μm) as the secondary material in which the sulfur concentration is 30 ppm and the ratio GV between carboxyl group and phenol-type hydroxyl group=0.2, 3 mass % plate-like graphite c as the electrical conduction aid in which the sulfur concentration is 200 ppm and the ratio GA between carboxyl group and phenol-type hydroxyl group=0.8, and 6 mass % PVDF. Except these, a battery was fabricated in the same manner as Example 1.

Example 9

The composition of the negative electrode mixture used herein was 81 mass % spherical natural graphite E (average particle size $D_{50m}=20$ μm) as the main material in which the sulfur concentration is 0 ppm and the ratio GM between carboxyl group and phenol-type hydroxyl group=0.9, 10 mass % massive non-graphitizable carbon A (average particle size $D_{50v}=11$ μm) as the secondary material in which the sulfur concentration is 30 ppm and the ratio GV between carboxyl group and phenol-type hydroxyl group=0.2, 3 mass % plate-like graphite a as the electrical conduction aid in which the sulfur concentration is 30 ppm, and 6 mass % PVDF. Except these, a battery was fabricated in the same manner as Example 1.

Example 10

The composition of the negative electrode mixture used herein was 71 mass % spherical natural graphite A (average particle size $D_{50m}=20$ μm) as the main material in which the sulfur concentration is 0 ppm and the ratio GM between carboxyl group and phenol-type hydroxyl group=0.5, 20 mass % massive non-graphitizable carbon A as the secondary material in which the sulfur concentration is 30 ppm and the ratio GV between carboxyl group and phenol-type hydroxyl group=0.2, 3 mass % plate-like graphite a as the electrical conduction aid in which the sulfur concentration is 30 ppm and the ratio GA between carboxyl group and phenol-type hydroxyl group=0.6, and 6 mass % PVDF. Except these, a battery was fabricated in the same manner as Example 1.

Example 11

The composition of the negative electrode mixture used herein was 61 mass % spherical natural graphite A (average particle size $D_{50m}=20$ μm) as the main material in which the sulfur concentration is 0 ppm and the ratio GM between carboxyl group and phenol-type hydroxyl group=0.5, 30 mass % massive non-graphitizable carbon A (average particle size $D_{50v}=11$ μm) as the secondary material in which the sulfur concentration is 30 ppm and the ratio GV between carboxyl group and phenol-type hydroxyl group=0.2, 3 mass % plate-like graphite a as the electrical conduction aid in which the sulfur concentration is 30 ppm and the ratio GA between carboxyl group and phenol-type hydroxyl group=0.6, and 6 mass % PVDF. Except these, a battery was fabricated in the same manner as Example 1.

Example 12

The composition of the negative electrode mixture used herein was 61 mass % spherical natural graphite A (average particle size $D_{50m}=20$ μm) as the main material in which the sulfur concentration is 0 ppm and the ratio GM between carboxyl group and phenol-type hydroxyl group=0.5, 30 mass % massive non-graphitizable carbon A (average particle size $D_{50v}=11$ μm) as the secondary material in which the sulfur concentration is 30 ppm and the ratio GV between carboxyl group and phenol-type hydroxyl group=0.2, 8 mass % plate-like graphite a as the electrical conduction aid in which the sulfur concentration is 30 ppm and the ratio GA between carboxyl group and phenol-type hydroxyl group=0.6, and 6 mass % PVDF. Except these, a battery was fabricated in the same manner as Example 1.

Example 13

The composition of the negative electrode mixture used herein was 78 mass % spherical natural graphite A (average particle size $D_{50m}=20$ μm) as the main material in which the sulfur concentration is 0 ppm and the ratio GM between carboxyl group and phenol-type hydroxyl group=0.5, 10 mass % massive non-graphitizable carbon A (average particle size $D_{50v}=11$ μm) as the secondary material in which the sulfur concentration is 30 ppm and the ratio GV between carboxyl group and phenol-type hydroxyl group=0.2, 3 mass % plate-like graphite a as an electrical conduction aid in which the sulfur concentration is 30 ppm and the ratio GA between carboxyl group and phenol-type hydroxyl group=0.6, further 3 mass % carbon black as an electrical conduction aid in which the sulfur concentration is 30 ppm and the ratio GA between carboxyl group and phenol-type hydroxyl group=1.2, and 6 mass % PVDF. Except these, a battery was fabricated in the same manner as Example 1. In Table 4, Sz, GA, and the amount of the electrical conduction aid added were written for plate-like graphite a among the electrical conduction aids.

Example 14

The composition of the negative electrode mixture used herein was 76 mass % spherical natural graphite A (average particle size $D_{50m}=20$ μm) as the main material in which the sulfur concentration is 0 ppm and the ratio GM between carboxyl group and phenol-type hydroxyl group=0.5, 10 mass % massive non-graphitizable carbon A (average particle size $D_{50v}=11$ μm) as the secondary material in which the sulfur concentration is 30 ppm and the ratio GV between carboxyl group and phenol-type hydroxyl group=0.2, 8 mass % plate-like graphite a as the electrical conduction aid in which the sulfur concentration is 30 ppm and the ratio GA between carboxyl group and phenol-type hydroxyl group=0.6, and 6 mass % PVDF. A solution in which $LiPF_6$ at 1 mol/L was dissolved as the electrolyte in the electrolytic solution and the cyclic disulfonic acid ester of formula (4) at 5.0 mass % was mixed as the additive was used. Except these, a battery was fabricated in the same manner as Example 1.

Example 15

The composition of the negative electrode mixture used herein was 81 mass % spherical natural graphite A (average particle size $D_{50m}$=20 μm) as the main material in which the sulfur concentration is 0 ppm and the ratio GM between carboxyl group and phenol-type hydroxyl group=0.5, 10 mass % massive non-graphitizable carbon A (average particle size $D_{50v}$=11 μm) as the secondary material in which the sulfur concentration is 30 ppm and the ratio GV between carboxyl group and phenol-type hydroxyl group=0.2, 3 mass % plate-like graphite a as the electrical conduction aid in which the sulfur concentration is 30 ppm and the ratio GA between carboxyl group and phenol-type hydroxyl group=0.6, and 6 mass % PVDF. A solution in which $LiPF_6$ at 1 mol/L was dissolved as the electrolyte in the electrolytic solution and the compound of formula (3) at 1 mass % and the cyclic disulfonic acid ester of formula (4) at 1.0 mass % were mixed as the additive was used. Except these, a battery was fabricated in the same manner as Example 1.

Example 16

The composition of the negative electrode mixture used herein was 81 mass % spherical natural graphite A (average particle size $D_{50m}$=20 μm) as the main material in which the sulfur concentration is 0 ppm and the ratio GM between carboxyl group and phenol-type hydroxyl group=0.5, 10 mass % massive non-graphitizable carbon A (average particle size $D_{50v}$=11 μm) as the secondary material in which the sulfur concentration is 30 ppm and the ratio GV between carboxyl group and phenol-type hydroxyl group=0.2, 3 mass % plate-like graphite a as the electrical conduction aid in which the sulfur concentration is 30 ppm and the ratio GA between carboxyl group and phenol-type hydroxyl group=0.6, and 6 mass % PVDF. A solution in which $LiPF_6$ at 1 mol/L was dissolved as the electrolyte in the electrolytic solution and vinylene carbonate (VC) at 2.0 mass % was mixed as the additive was used. Except these, a battery was fabricated in the same manner as Example 1.

Example 17

The composition of the negative electrode mixture used herein was 81 mass % spherical natural graphite A (average particle size $D_{50m}$=20 μm) as the main material in which the sulfur concentration is 0 ppm and the ratio GM between carboxyl group and phenol-type hydroxyl group=0.5, 10 mass % massive non-graphitizable carbon A (average particle size $D_{50v}$=11 μm) as the secondary material in which the sulfur concentration is 30 ppm and the ratio GV between carboxyl group and phenol-type hydroxyl group=0.2, 3 mass % plate-like graphite a as the electrical conduction aid in which the sulfur concentration is 30 ppm and the ratio GA between carboxyl group and phenol-type hydroxyl group=0.6, and 6 mass % PVDF. A solution in which $LiPF_6$ at 1 mol/L was dissolved as the electrolyte in the electrolytic solution and propanesultone (PS) at 2.0 mass % was mixed as the additive was used. Except these, a battery was fabricated in the same manner as Example 1.

Example 18

The composition of the negative electrode mixture used herein was 81 mass % spherical natural graphite A (average particle size $D_{50m}$=20 μm) as the main material in which the sulfur concentration is 0 ppm and the ratio GM between carboxyl group and phenol-type hydroxyl group=0.5, 10 mass % massive non-graphitizable carbon A (average particle size $D_{50v}$=11 μm) as the secondary material in which the sulfur concentration is 30 ppm and the ratio GV between carboxyl group and phenol-type hydroxyl group=0.2, 3 mass % plate-like graphite a as the electrical conduction aid in which the sulfur concentration is 30 ppm and the ratio GA between carboxyl group and phenol-type hydroxyl group=0.6, and 6 mass % PVDF. A solution in which $LiPF_6$ at 1 mol/L was dissolved as the electrolyte in the electrolytic solution and the cyclic disulfonic acid ester of formula (4) at 1.0 mass % and propanesultone (PS) at 1.0 mass % were mixed as the additive was used. Except these, a battery was fabricated in the same manner as Example 1.

Example 19

The composition of the negative electrode mixture used herein was 81 mass % spherical natural graphite A (average particle size $D_{50m}$=20 μm) as the main material in which the sulfur concentration is 0 ppm and the ratio GM between carboxyl group and phenol-type hydroxyl group=0.5, 10 mass % massive non-graphitizable carbon A (average particle size $D_{50v}$=11 μm) as the secondary material in which the sulfur concentration is 30 ppm and the ratio GV between carboxyl group and phenol-type hydroxyl group=0.2, 3 mass % plate-like graphite a as the electrical conduction aid in which the sulfur concentration is 30 ppm and the ratio GA between carboxyl group and phenol-type hydroxyl group=0.6, and 6 mass % PVDF. A solution in which $LiPF_6$ at 1 mol/L was dissolved as the electrolyte in the electrolytic solution and the cyclic disulfonic acid ester of formula (4) at 1.0 mass % and vinylene carbonate (VC) at 1.0 mass % were mixed as the additive was used. Except these, a battery was fabricated in the same manner as Example 1.

Example 20

The composition of the negative electrode mixture used herein was 81 mass % spherical natural graphite A (average particle size $D_{50m}$=20 μm) as the main material in which the sulfur concentration is 0 ppm and the ratio GM between carboxyl group and phenol-type hydroxyl group=0.5, 10 mass % massive artificial graphite A (average particle size $D_{50v}$=13 μm) as the secondary material in which the sulfur concentration is 30 ppm and the ratio GV between carboxyl group and phenol-type hydroxyl group=0.3, 3 mass % plate-like graphite a as the electrical conduction aid in which the sulfur concentration is 30 ppm and the ratio GA between carboxyl group and phenol-type hydroxyl group=0.6, and 6 mass % PVDF. A solution in which $LiPF_6$ at 1 mol/L was dissolved as the electrolyte in the electrolytic solution and the compound of formula (3) at 1 mass % and the cyclic disulfonic acid ester of formula (4) at 1.0 mass % were mixed as the additive was used. Except these, a battery was fabricated in the same manner as Example 1.

Example 21

The composition of the negative electrode mixture used herein was 71 mass % spherical natural graphite A (average particle size $D_{50m}$=20 μm) as the main material in which the sulfur concentration is 0 ppm and the ratio GM between carboxyl group and phenol-type hydroxyl group=0.5, 20 mass % massive artificial graphite A (average particle size $D_{50v}$=13 μm) as the secondary material in which the sulfur concentration is 30 ppm and the ratio GV between carboxyl group and phenol-type hydroxyl group=0.3, 3 mass % plate-like graphite a as the electrical conduction aid in which the sulfur concentration is 30 ppm and the ratio GA between carboxyl group and phenol-type hydroxyl group=0.6, and 6 mass % PVDF. A solution in which $LiPF_6$ at 1 mol/L was dissolved as the electrolyte in the electrolytic solution and the compound of formula (3) at 1 mass % and the cyclic disulfonic acid ester of formula (4) at 1.0 mass % were mixed as the additive was used. Except these, a battery was fabricated in the same manner as Example 1.

Example 22

The composition of the negative electrode mixture used herein was 81 mass % spherical artificial graphite A (average particle size $D_{50m}$=23 μm) as the main material in which the sulfur concentration is 0 ppm and the ratio GM between carboxyl group and phenol-type hydroxyl group=0.5, 10 mass % massive artificial graphite A (average particle size $D_{50v}$=13 μm) as the secondary material in which the sulfur concentration is 30 ppm and the ratio GV between carboxyl group and phenol-type hydroxyl group=0.3, 3 mass % plate-like graphite a as the electrical conduction aid in which the sulfur concentration is 30 ppm and the ratio GA between carboxyl group and phenol-type hydroxyl group=0.6, and 6 mass % PVDF. A solution in which $LiPF_6$ at 1 mol/L was dissolved as the electrolyte in the electrolytic solution and the compound of formula (3) at 1 mass % and the cyclic disulfonic acid ester of formula (4) at 1.0 mass % were mixed as the additive was used. Except these, a battery was fabricated in the same manner as Example 1.

Example 23

The composition of the negative electrode mixture used herein was 69 mass % spherical natural graphite A (average particle size $D_{50m}$=20 μm) as the main material in which the sulfur concentration is 0 ppm and the ratio GM between carboxyl group and phenol-type hydroxyl group=0.5, 10 mass % massive non-graphitizable carbon A (average particle size $D_{50v}$=11 μm) as the secondary material in which the sulfur concentration is 30 ppm and the ratio GV between carboxyl group and phenol-type hydroxyl group=0.2, 15 mass % plate-like graphite a as the electrical conduction aid in which the sulfur concentration is 30 ppm and the ratio GA between carboxyl group and phenol-type hydroxyl group=0.6, and 6 mass % PVDF. Except these, a battery was fabricated in the same manner as Example 1.

Reference Example 1

The composition of the negative electrode mixture used herein was 81 mass % spherical natural graphite B (average particle size $D_{50m}$=20 μm) as the main material in which the sulfur concentration is 30 ppm and the ratio GM between carboxyl group and phenol-type hydroxyl group=0.5, 10 mass % massive non-graphitizable carbon A (average particle size $D_{50v}$=11 μm) as the secondary material in which the sulfur concentration is 30 ppm and the ratio GV between carboxyl group and phenol-type hydroxyl group=0.2, 3 mass % plate-like graphite d as the electrical conduction aid in which the sulfur concentration is 350 ppm and the ratio GA between carboxyl group and phenol-type hydroxyl group=1.2, and 6 mass % PVDF. Except these, a battery was fabricated in the same manner as Example 1.

Comparative Example 1

The composition of the negative electrode mixture used herein was 81 mass % spherical natural graphite F (average particle size $D_{50m}$=20 μm) as the main material in which the sulfur concentration is 320 ppm and the ratio GM between carboxyl group and phenol-type hydroxyl group=0.5, 10 mass % massive non-graphitizable carbon A (average particle size $D_{50v}$=11 μm) as the secondary material in which the sulfur concentration is 30 ppm and the ratio GV between carboxyl group and phenol-type hydroxyl group=0.2, 3 mass % plate-like graphite a as the electrical conduction aid in which the sulfur concentration is 30 ppm and the ratio GA between carboxyl group and phenol-type hydroxyl group=0.6, and 6 mass % PVDF. Except these, a battery was fabricated in the same manner as Example 1.

Comparative Example 2

The composition of the negative electrode mixture used herein was 81 mass % spherical natural graphite B (average particle size $D_{50m}$=20 μm) as the main material in which the sulfur concentration is 30 ppm and the ratio GM between carboxyl group and phenol-type hydroxyl group=0.5, 10 mass % massive non-graphitizable carbon D (average particle size $D_{50v}$=11 μm) as the secondary material in which the sulfur concentration is 330 ppm and the ratio GV between carboxyl group and phenol-type hydroxyl group=1.2, 3 mass % plate-like graphite a as the electrical conduction aid in which the sulfur concentration is 30 ppm and the ratio GA between carboxyl group and phenol-type hydroxyl group=0.6, and 6 mass % PVDF. Except these, a battery was fabricated in the same manner as Example 1.

Reference Example 3

The composition of the negative electrode mixture used herein was 81 mass % spherical natural graphite G (average particle size $D_{50m}$=20 μm) as the main material in which the sulfur concentration is 0 ppm and the ratio GM between carboxyl group and phenol-type hydroxyl group=0.09, 10 mass % massive non-graphitizable carbon A (average particle size $D_{50v}$=11 μm) as the secondary material in which the sulfur concentration is 30 ppm and the ratio GV between carboxyl group and phenol-type hydroxyl group=0.2, 3 mass % plate-like graphite a as the electrical conduction aid in which the sulfur concentration is 30 ppm and the ratio GA between carboxyl group and phenol-type hydroxyl group=0.6, and 6 mass % PVDF. Except these, a battery was fabricated in the same manner as Example 1.

Reference Example 4

The composition of the negative electrode mixture used herein was 81 mass % spherical natural graphite H (average particle size $D_{50m}$=20 μm) as the main material in which the sulfur concentration is 0 ppm and the ratio GM between carboxyl group and phenol-type hydroxyl group=1.2, 10 mass % massive non-graphitizable carbon A (average particle size $D_{50v}$=11 μm) as the secondary material in which the sulfur concentration is 30 ppm and the ratio GV between carboxyl group and phenol-type hydroxyl group=0.2, 3 mass % plate-like graphite a as the electrical conduction aid in which the sulfur concentration is 30 ppm and the ratio GA between carboxyl group and phenol-type hydroxyl group=0.6, and 6 mass % PVDF. Except these, a battery was fabricated in the same manner as Example 1.

Reference Example 5

The composition of the negative electrode mixture used herein was 91 mass % spherical natural graphite A (average particle size $D_{50m}$=20 μm) as the main material in which the sulfur concentration is 0 ppm and the ratio GM between carboxyl group and phenol-type hydroxyl group=0.5, no secondary material added, 3 mass % plate-like graphite a as the electrical conduction aid in which the sulfur concentration is 30 ppm and the ratio GA between carboxyl group and phenol-type hydroxyl group=0.6, and 6 mass % PVDF. Except these, a battery was fabricated in the same manner as Example 1.

Reference Example 6

The composition of the negative electrode mixture used herein was 84 mass % spherical natural graphite A (average particle size $D_{50m}$=20 μm) as the main material in which the sulfur concentration is 0 ppm and the ratio GM between carboxyl group and phenol-type hydroxyl group=0.5, 10 mass % massive non-graphitizable carbon A (average particle size $D_{50v}$=11 μm) as the secondary material in which the sulfur concentration is 30 ppm and the ratio GV between carboxyl group and phenol-type hydroxyl group=0.2, no electrical conduction aid added, and 6 mass % PVDF. Except these, a battery was fabricated in the same manner as Example 1.

Reference Example 7

The composition of the negative electrode mixture used herein was 81 mass % spherical natural graphite A (average particle size $D_{50m}$=20 μm) as the main material in which the sulfur concentration is 0 ppm and the ratio GM between carboxyl group and phenol-type hydroxyl group=0.5, 10 mass % massive non-graphitizable carbon A (average particle size $D_{50v}$=11 μm) as the secondary material in which the sulfur concentration is 30 ppm and the ratio GV between carboxyl group and phenol-type hydroxyl group=0.2, 3 mass % carbon black as the electrical conduction aid in which the sulfur concentration is 30 ppm and the ratio GA between carboxyl group and phenol-type hydroxyl group=1.2, and 6 mass % PVDF. A solution in which $LiPF_6$ at 1 mol/L was dissolved as the electrolyte in the electrolytic solution and the cyclic disulfonic acid ester of formula (4) at 4.0 mass % was mixed was used. Except these, a battery was fabricated in the same manner as Example 1.

Reference Example 8

The composition of the negative electrode mixture used herein was 81 mass % spherical natural graphite A (average particle size $D_{50m}$=20 μm) as the main material in which the sulfur concentration is 0 ppm and the ratio GM between carboxyl group and phenol-type hydroxyl group=0.5, 10 mass % massive non-graphitizable carbon A (average particle size $D_{50v}$=11 μm) as the secondary material in which the sulfur concentration is 30 ppm and the ratio GV between carboxyl group and phenol-type hydroxyl group=0.2, 3 mass % plate-like graphite a as the electrical conduction aid in which the sulfur concentration is 30 ppm and the ratio GA between carboxyl group and phenol-type hydroxyl group=0.6, 6 mass % PVDF, and no additive of the electrolytic solution added. Except these, a battery was fabricated in the same manner as Example 1.

Reference Example 9

The composition of the negative electrode mixture used herein was 84 mass % spherical natural graphite A (average particle size $D_{50m}$=20 μm) as the main material in which the sulfur concentration is 0 ppm and the ratio GM between carboxyl group and phenol-type hydroxyl group=0.5, 10 mass % massive non-graphitizable carbon A (average particle size $D_{50v}$=11 μm) as the secondary material in which the sulfur concentration is 30 ppm and the ratio GV between carboxyl group and phenol-type hydroxyl group=0.2, no electrical conduction aid added, and 6 mass % PVDF. Except these, a battery was fabricated in the same manner as Example 1.

Reference Example 10

The composition of the negative electrode mixture used herein was 84 mass % spherical natural graphite A (average particle size $D_{50m}$=20 μm) as the main material in which the sulfur concentration is 0 ppm and the ratio GM between carboxyl group and phenol-type hydroxyl group=0.5, 10 mass % massive non-graphitizable carbon A (average particle size $D_{50v}$=11 μm) as the secondary material in which the sulfur concentration is 30 ppm and the ratio GV between carboxyl group and phenol-type hydroxyl group=0.2, no electrical conduction aid added, and 6 mass % PVDF. $LiPF_6$ at 1 mol/L was dissolved as the electrolyte in the electrolytic solution, and vinylene carbonate (VC) at 2.0 mass % was used as the additive. Except these, a battery was fabricated in the same manner as Example 1.

Reference Example 11

The composition of the negative electrode mixture used herein was 84 mass % spherical natural graphite A (average particle size $D_{50m}$=20 μm) as the main material in which the sulfur concentration is 0 ppm and the ratio GM between carboxyl group and phenol-type hydroxyl group=0.5, 10 mass % massive non-graphitizable carbon A (average particle size $D_{50v}$=11 μm) as the secondary material in which the sulfur concentration is 30 ppm and the ratio GM between carboxyl group and phenol-type hydroxyl group=0.2, no electrical conduction aid added, and 6 mass % PVDF. A solution in which $LiPF_6$ at 1 mol/L was dissolved as the electrolyte in the electrolytic solution, and propanesultone (PS) at 2.0 mass % was used as the additive. Except these, a battery was fabricated in the same manner as Example 1.
(Checking of the Forms of the Negative Electrode Active Material and the Electrical Conduction Aid and the Contact State Between the Negative Electrode Active Material and the Electrical Conduction Aid)

By SEM (scanning microscope) observation, it has been confirmed that the main material (the first carbon) of the negative electrode active material had a spherical form, the secondary material (the second carbon) had a massive form, and the electrical conduction aid had a plate-like form in Examples 1 to 23, Reference Examples 1 to 11, and Comparative Examples 1 and 2. Furthermore, it has been confirmed that, in Examples 1 to 23 and Reference Example 1, part of the edge surface of the electrical conduction aid was in contact with the surfaces of the main material and the secondary material of the negative electrode active material. Similarly, it has been confirmed that, also in Comparative Examples 1 and 2 and Reference Examples 3 to 5 and 8, part of the edge surface of the electrical conduction aid was in contact with the surface of the main material and/or the secondary material of the negative electrode active material.

(Measurement of the Capacity Retention Rate in a High Temperature Environment and Observation of the Negative Electrode Surface after Cycles)

The life test was performed by repeating charging and discharging in a constant temperature oven. Specifically, the lithium ion batteries fabricated in the Examples, reference examples, and Comparative Examples described above were charged under a constant current charging condition of 1 C to an upper limit voltage of 4.2 V and subsequently constant voltage charging at 4.2 V so that a total charging time is 2.5 hours. For discharging, constant current discharging was performed at 1 C to 2.5 V. The charging and discharging were taken as one cycle, and 500 cycles were repeated. The ratio of the discharge capacity after 500 cycles to the initial discharge capacity was taken as the capacity retention rate. The temperature of the constant temperature oven was set to a temperature of 45° C., which is higher than normal temperature, because degradation is accelerated and thereby the lifetime characteristics can be ascertained earlier. The battery was disassembled after 500 cycles at 45° C., and the negative electrode surface was observed with a SEM (scanning electron microscope) and a stereoscopic microscope.

Table 1 shows major properties of the non-graphitizable carbon A and the artificial graphite A used as the second carbon (the secondary material) in the negative electrode of each lithium ion battery. Table 2 shows the characteristics of the plate-like graphite a used as the electrical conduction aid, and Table 3 to Table 5 show the constitution of the negative electrode, the measurement result of the capacity retention rate after 500 cycles, and the observation result of the negative electrode surface after battery disassembly of each lithium ion battery.

The abbreviations etc. in the tables are as follows:
Sx: sulfur concentration in the first carbon (ppm)
Sy: sulfur concentration in the second carbon (ppm)
Sz: sulfur concentration in the electrical conduction aid (ppm)
GM(sf): ratio between carboxyl group and phenol-type hydroxyl group that are surface functional groups of the first carbon (carboxyl group/phenol-type hydroxyl group)
GV(sf): ratio between carboxyl group and phenol-type hydroxyl group that are surface functional groups of the second carbon (carboxyl group/phenol-type hydroxyl group)
GA(sf): ratio between carboxyl group and phenol-type hydroxyl group that are surface functional groups of the electrical conduction aid (carboxyl group/phenol-type hydroxyl group)
Amount of secondary material added: The proportion of the secondary material in the total mass of the negative electrode mixture (the total mass of the negative electrode active material, the electrical conduction aid, and the negative electrode binder) (mass %)
Amount of electrical conduction aid added: The proportion of the electrical conduction aid in the total mass of the negative electrode mixture (the total mass of the negative electrode active material, the electrical conduction aid, and the negative electrode binder) (mass %)
Formula (3): compound represented by formula (3) (the additive)
Formula (4): compound represented by formula (4) (the additive)
Additive content: The proportion of the additive in the total mass of the electrolytic solution (mass %)
Capacity retention rate: The capacity retention rate after 500 cycles at 45° C. (%)
Rapid fading: The measurement for the prescribed number of cycles was carried out because the capacity degraded rapidly in the course of the cycles.
Evaluation of state of negative electrode surface:
  ○: Good. A precipitate on the negative electrode surface was not observed.
  Δ: A small amount of precipitate was observed.
  x: A precipitate was observed.

TABLE 1

| Type of second carbon of negative electrode active material | Size of primary particle $D_{50y}$ | Form of particle | Surface functional group coefficient GV (sf) | Specific surface area BET ($m^2/g$) | Raman G/D ratio ($I_G/I_D$) |
|---|---|---|---|---|---|
| non-graphitizable carbon A | 11 μm | Massive | 0.2 | 5.5 | 1.0 |
| artificial graphite A | 13 μm | Massive | 0.3 | 3.3 | 1.5 |

TABLE 2

| Type of electrical conduction aid | Size of primary particle | Distribution of secondary particles | Form of particle | Specific surface area BET ($m_2/g$) | Raman G/D ratio ($I_G/I_D$) |
|---|---|---|---|---|---|
| Plate-like graphite a | $D_{50z}$ = 3 μm Plate thickness = 0.1 μm | No cohesion | Plate-like form | 15 | 2.8 |
| Carbon black | Average diameter = 40 nm | 0.1-100 μm | Particulate form | 60 | 1.0 |

TABLE 3

| | Negative electrode active material | | Electrical conduction aid | Sulfur concentration (ppm) | | | Surface functional group | | |
|---|---|---|---|---|---|---|---|---|---|
| | First carbon | Second carbon | | Sx | Sy | Sz | GM (sf) | GV (sf) | GA (sf) |
| Ex. 1 | Sp nat. gr A | Mas. non-gr. Cb. A | Pl-like gr. a | 0 | 30 | 30 | 0.5 | 0.2 | 0.6 |
| Ex. 2 | Sp nat. gr B | Mas. non-gr. Cb. A | Pl-like gr. a | 30 | 30 | 30 | 0.5 | 0.2 | 0.6 |

TABLE 3-continued

| | First carbon | Second carbon | | | | | | | |
|---|---|---|---|---|---|---|---|---|---|
| Ex. 3 | Sp nat. gr C | Mas. non-gr. Cb. A | Pl-like gr. a | 160 | 30 | 30 | 0.5 | 0.2 | 0.6 |
| Ex. 4 | Sp nat. gr D | Mas. non-gr. Cb. A | Pl-like gr. a | 230 | 30 | 30 | 0.5 | 0.2 | 0.6 |
| Ex. 5 | Sp nat. gr B | Mas. non-gr. Cb. B | Pl-like gr. a | 30 | 100 | 30 | 0.5 | 0.3 | 0.6 |
| Ex. 6 | Sp nat. gr B | Mas. non-gr. Cb. C | Pl-like gr. a | 30 | 200 | 30 | 0.5 | 0.6 | 0.6 |
| Ex. 7 | Sp nat. gr B | Mas. non-gr. Cb. A | Pl-like gr. b | 30 | 30 | 100 | 0.5 | 0.2 | 0.7 |
| Ex. 8 | Sp nat. gr B | Mas. non-gr. Cb. A | Pl-like gr. c | 30 | 30 | 200 | 0.5 | 0.2 | 0.8 |
| Ex. 9 | Sp nat. gr E | Mas. non-gr. Cb. A | Pl-like gr. a | 0 | 30 | 30 | 0.9 | 0.2 | 0.6 |
| Ex. 10 | Sp nat. gr A | Mas. non-gr. Cb. A | Pl-like gr. a | 0 | 30 | 30 | 0.5 | 0.2 | 0.6 |
| Ex. 11 | Sp nat. gr A | Mas. non-gr. Cb. A | Pl-like gr. a | 0 | 30 | 30 | 0.5 | 0.2 | 0.6 |
| Ex. 12 | Sp nat. gr A | Mas. non-gr. Cb. A | Pl-like gr. a | 0 | 30 | 30 | 0.5 | 0.2 | 0.6 |

| | Secondary material added (mass %) | Electrical conduction aid added (mass %) | Additives in electrolytic solution | | Capacity retention rate (%) | State of negative electrode surface |
|---|---|---|---|---|---|---|
| | | | Type | Content (mass %) | | |
| Ex. 1 | 10 | 3 | Fl(4) | 2 | 86 | o |
| Ex. 2 | 10 | 3 | Fl(4) | 2 | 84 | o |
| Ex. 3 | 10 | 3 | Fl(4) | 2 | 80 | o |
| Ex. 4 | 10 | 3 | Fl(4) | 2 | 72 | o |
| Ex. 5 | 10 | 3 | Fl(4) | 2 | 83 | o |
| Ex. 6 | 10 | 3 | Fl(4) | 2 | 82 | o |
| Ex. 7 | 10 | 3 | Fl(4) | 2 | 84 | o |
| Ex. 8 | 10 | 3 | Fl(4) | 2 | 81 | o |
| Ex. 9 | 10 | 3 | Fl(4) | 2 | 80 | o |
| Ex. 10 | 20 | 3 | Fl(4) | 2 | 85 | o |
| Ex. 11 | 30 | 3 | Fl(4) | 2 | 85 | o |
| Ex. 12 | 30 | 8 | Fl(4) | 2 | 86 | o |

Abbreviations:
Ex. = Example
Sp nat. gr = Spherical natural graphite
Mas. non-gr. Cb. = Massive non-graphitizable carbon
Pl-like gr. = Plate-like graphite
Fl = formula
o = good

TABLE 4

| | Negative electrode active material | | Electrical conduction aid | Sulfur concentration (ppm) | | | Surface functional group | | |
|---|---|---|---|---|---|---|---|---|---|
| | First carbon | Second carbon | | Sx | Sy | Sz | GM (sf) | GV (sf) | GA (sf) |
| Ex. 13 | Sp nat. gr A | Mas. non-gr. Cb. A | Pl-like gr. a + CB | 0 | 30 | 30 | 0.5 | 0.2 | 0.6 |
| Ex. 14 | Sp nat. gr A | Mas. non-gr. Cb. A | Pl-like gr. a | 0 | 30 | 30 | 0.5 | 0.2 | 0.6 |
| Ex. 15 | Sp nat. gr A | Mas. non-gr. Cb. A | Pl-like gr. a | 0 | 30 | 30 | 0.5 | 0.2 | 0.6 |
| Ex. 16 | Sp nat. gr A | Mas. non-gr. Cb. A | Pl-like gr. a | 0 | 30 | 30 | 0.5 | 0.2 | 0.6 |
| Ex. 17 | Sp nat. gr A | Mas. non-gr. Cb. A | Pl-like gr. a | 0 | 30 | 30 | 0.5 | 0.2 | 0.6 |
| Ex. 18 | Sp nat. gr A | Mas. non-gr. Cb. A | Pl-like gr. a | 0 | 30 | 30 | 0.5 | 0.2 | 0.6 |
| Ex. 19 | Sp nat. gr A | Mas. non-gr. Cb. A | Pl-like gr. a | 0 | 30 | 30 | 0.5 | 0.2 | 0.6 |
| Ex. 20 | Sp nat. gr A | Mas. art-gr. A | Pl-like gr. a | 0 | 30 | 30 | 0.5 | 0.3 | 0.6 |
| Ex. 21 | Sp nat. gr A | Mas. art-gr. A | Pl-like gr. a | 0 | 30 | 30 | 0.5 | 0.3 | 0.6 |
| Ex. 22 | Sp Art. gr. A | Mas. art-gr. A | Pl-like gr. a | 0 | 30 | 30 | 0.5 | 0.3 | 0.6 |
| Ex. 23 | Sp nat. gr A | Mas. non-gr. Cb. A | Pl-like gr. a | 0 | 30 | 30 | 0.5 | 0.2 | 0.6 |
| Ref-Ex. 1 | Sp nat. gr B | Mas. non-gr. Cb. A | Pl-like gr. d | 30 | 30 | 350 | 0.5 | 0.2 | 1.2 |

| | Secondary material added (mass %) | Electrical conduction aid added (mass %) | Additives in electrolytic solution | | Capacity retention rate (%) | State of negative electrode surface |
|---|---|---|---|---|---|---|
| | | | Type | Content (mass %) | | |
| Ex. 13 | 10 | 3 | Fl(4) | 2 | 72 | o |
| Ex. 14 | 10 | 8 | Fl(4) | 5 | 76 | o |
| Ex. 15 | 10 | 3 | Fl(3) + Fl(4) | Fl(3):1 Fl(4):1 | 87 | o |
| Ex. 16 | 10 | 3 | VC | 2 | 80 | o |
| Ex. 17 | 10 | 3 | PS | 2 | 80 | o |
| Ex. 18 | 10 | 3 | Fl(4) + PS | Fl(4):1 PS:1 | 86 | o |

TABLE 4-continued

|   | | | | | | |
|---|---|---|---|---|---|---|
| Ex. 19 | 10 | 3 | Fl(4) + VC | Fl(4):1 VC:1 | 86 | ○ |
| Ex. 20 | 10 | 3 | Fl(3) + Fl(4) | Fl(3):1 Fl(4):1 | 87 | ○ |
| Ex. 21 | 20 | 3 | Fl(3) + Fl(4) | Fl(3):1 Fl(4):1 | 88 | ○ |
| Ex. 22 | 10 | 3 | Fl(3) + Fl(4) | Fl(3):1 Fl(4):1 | 89 | ○ |
| Ex. 23 | 10 | 15 | Fl(4) | 2 | 66 | Δ |
| Ref-Ex. 1 | 10 | 3 | Fl(4) | 2 | 55 | x |

Abbreviations (also see footnotes of Table 3):
Ref-Ex. = Referential Example
Sp Art. gr = Spherical artificial graphite;
Mas. art-gr. = Massive artificial graphite;
CB = Carbon black
Δ = Small amount of precipitate present;
x = Precipitate present

TABLE 5

| | Negative electrode active material | | Electrical conduction | Sulfur concentration (ppm) | | | Surface functional group | | |
|---|---|---|---|---|---|---|---|---|---|
| | First carbon | Second carbon | aid | $S_x$ | $S_y$ | $S_z$ | GM (sf) | GV (sf) | GA (sf) |
| Comp-Ex. 1 | Sp nat. gr F | Mas. non-gr. Cb. A | Pl-like gr. a | 320 | 30 | 30 | 0.5 | 0.2 | 0.6 |
| Comp-Ex. 2 | Sp nat. gr B | Mas. non-gr. Cb. D | Pl-like gr. a | 30 | 330 | 30 | 0.5 | 1.2 | 0.6 |
| Ref-Ex. 3 | Sp nat. gr G | Mas. non-gr. Cb. A | Pl-like gr. a | 0 | 30 | 30 | 0.09 | 0.2 | 0.6 |
| Ref-Ex. 4 | Sp nat. gr H | Mas. non-gr. Cb. A | Pl-like gr. a | 0 | 30 | 30 | 1.2 | 0.2 | 0.6 |
| Ref-Ex. 5 | Sp nat. gr A | none | Pl-like gr. a | 0 | — | 30 | 0.5 | — | 0.6 |
| Ref-Ex. 6 | Sp nat. gr A | Mas. non-gr. Cb. A | none | 0 | 30 | — | 0.5 | 0.2 | — |
| Ref-Ex. 7 | Sp nat. gr A | Mas. non-gr. Cb. A | CB | 0 | 30 | 30 | 0.5 | 0.2 | 1.2 |
| Ref-Ex. 8 | Sp nat. gr A | Mas. non-gr. Cb. A | Pl-like gr. a | 0 | 30 | 30 | 0.5 | 0.2 | 0.6 |
| Ref-Ex. 9 | Sp nat. gr A | Mas. non-gr. Cb. A | none | 0 | 30 | — | 0.5 | 0.2 | — |
| Ref-Ex. 10 | Sp nat. gr A | Mas. non-gr. Cb. A | none | 0 | 30 | — | 0.5 | 0.2 | — |
| Ref-Ex. 11 | Sp nat. gr A | Mas. non-gr. Cb. A | none | 0 | 30 | — | 0.5 | 0.2 | — |

| | Secondary material added (mass %) | Electrical conduction aid added (mass %) | Additives in electrolytic solution | | Capacity retention rate (%) | State of negative electrode surface |
|---|---|---|---|---|---|---|
| | | | Type | Content (mass %) | | |
| Comp-Ex. 1 | 10 | 3 | Fl(4) | 2 | Fading | x |
| Comp-Ex. 2 | 10 | 3 | Fl(4) | 2 | 52 | x |
| Ref-Ex. 3 | 10 | 3 | Fl(4) | 2 | 50 | x |
| Ref-Ex. 4 | 10 | 3 | Fl(4) | 2 | 45 | x |
| Ref-Ex. 5 | 0 | 3 | Fl(4) | 2 | 53 | Δ |
| Ref-Ex. 6 | 10 | 0 | Fl(4) | 2 | Fading | x |
| Ref-Ex. 7 | 10 | 3 | Fl(4) | 4 | 61 | Δ |
| Ref-Ex. 8 | 10 | 3 | none | 0 | 43 | x |
| Ref-Ex. 9 | 10 | 3 | Fl(4) | 2 | Fading | x |
| Ref-Ex. 10 | 10 | 3 | VC | 2 | Fading | x |
| Ref-Ex. 11 | 10 | 3 | PS | 2 | Fading | x |

Abbreviations (also see footnotes of Tables 3 and 4):
Comp-Ex. = Comparative Example
Fading = Rapid fading The lithium ion batteries fabricated in the Examples were able to be charged and discharged without the occurrence of severe capacity degradation even in a high temperature environment of 45° C. It is presumed that, in these Examples, a good-quality SEI film was formed by adding into the electrolytic solution an additive that reductively decomposes at a voltage lower than the reduction voltage of the solvent.

In contrast, there was a tendency that capacity degradation was severe in the case where the sulfur concentration ($S_x$) or the sulfur concentration ($S_y$) was more than 300 ppm for the first carbon or the second carbon (Comparative Examples 1 and 2) and in the case where the ratio between carboxyl group and phenol-type hydroxyl group that are surface functional groups (carboxyl group/phenol-type hydroxyl group) GM(sf) or GV(sf) was not in the range of 0.1 to 1.1 (Comparative Example 2 and Reference Examples 3 and 4). In the case of containing no electrical conduction aid (Reference Examples 6 and 9 to 11), rapid fading occurred. In the case of containing no second carbon (Reference Example 5) and in the case of containing no plate-like graphite as the electrical conduction aid (Reference Example 7), there was a tendency that capacity degradation was severe. In the case where the $S_z$ of the plate-like graphite electrical conduction aid was more than 300 ppm and GA(sf) was not in the range of 0.1 to 1.1 (Reference Example 1), there was a tendency that capacity degradation was severe as compared to Examples 1 to 23.

AC impedance measurement was performed. It has been found that, in the lithium ion batteries of Comparative Examples 1 and 2 and Reference Examples 3 to 11, the electronic resistance and the charge transfer resistance were increased as compared to Examples 1 to 23. That is, it is presumed that the capacity retention rate was reduced because the internal resistance of the lithium ion battery of Comparative Examples 1 and 2 and Reference Examples 3 to 11 was increased. A possible factor in the increase in electronic resistance is the consumption of the electrolytic solution during cycle repetition because a good-quality SEI film have not been formed on the surface of the graphite negative electrode. When the battery was disassembled and the surface of the negative electrode was observed, a brown or white precipitate was seen in the batteries in which rapid fading occurred or the batteries in which capacity degradation was severe (see Tables 3 to 5). The Cells in which a precipitate was produced on the negative electrode surface are batteries of low safety.

In the case where only carbon black was used as the electrical conduction aid (Reference Example 7), it is presumed that since the electrically conductive network formed by the contact between negative electrode active materials was cut and each negative electrode active material was isolated, a resistance was increased, resulting in capacity degradation.

In addition, Examples 1 to 23 have shown that good high temperature cycle property at 45° C. is obtained when either any one of the compound represented by formula (3), the compound represented by formula (4), VC, and PS is used alone or in combination as the additive of the electrolytic solution.

When the surface of the negative electrode fabricated in Examples 1 to 23 was observed by SEM, it has been found that there was massive graphite around spherical graphite, and part of the edge surface of plate-like graphite was in contact with the spherical graphite and the massive graphite. It is presumed that the formation of a strong SEI film is promoted by part of the edge surface of plate-like graphite being in contact with the active material of the main material and the secondary material in this way.

(Effects of the Surface Functional Group Coefficient)

Reference Examples 3 and 4 are lithium ion batteries using a negative electrode active material in which the GM(sf) of the first carbon (spherical natural graphite) is not in the range of 0.1 to 1.1, and exhibited severer capacity degradation than Examples. FIG. 2 shows the dQ/dV value with respect to the voltage of the horizontal axis for Examples 1 and 9 and Reference Examples 3 and 4. Here, the reaction rate of the reductive decomposition reaction of the additive in the electrolytic solution can be estimated from the capacity change curve at 2.2 to 2.8 V of the lithium ion battery. That is, it can be found from the area surrounded by the dQ/dV value shown in FIG. 2 and the voltage (2.2 to 2.8 V) of the horizontal axis. For the lithium ion batteries of Examples 1 and 9, a peak indicating a reduction reaction was observed around 2.3 V (see the arrow). In contrast, in Reference Example 4, a peak around 2.3 V was not seen, and a peak was seen around 2.6 to 2.7 V. Hence, although a detailed mechanism is not clear, it has been suggested that there is a correlation between the surface functional group coefficient GM(sf) of the graphite of the first carbon of the negative electrode active material and the reduction reaction of the additive.

When attention is focused on around 3.0 to 3.2 V of FIG. 2, it is found that a distinct peak has appeared in Reference Example 3 and Reference Example 4. The peak is based on the decomposition reaction of the solvent component in the electrolytic solution, and the decomposition of the solvent in the electrolytic solution occurred greatly in Reference Examples 3 and 4. Presumably, this is because in Reference Examples 3 and 4, a low resistive good-quality SEI film was not formed because the decomposition reaction of the additive did not occur sufficiently, and the decomposition reaction of the solvent in the electrolytic solution occurred. It is suggested that in the lithium ion batteries of Reference Examples 3 and 4, the capacity degradation of the battery occurred severely because of the decomposition of the solvent in the electrolytic solution.

As described above, it has been found that by employing a lithium ion battery of the constitution of the present invention, the decomposition of the additive in the electrolytic solution is promoted and a strong SEI film is formed on the surfaces of the main material and the secondary material of the negative electrode active material and the electrical conduction aid; consequently, good cycle property at high temperature is achieved. It has also been found that better cycle property is obtained by using particularly a cyclic sulfonic acid ester or a linear sulfonic acid ester having two sulfonyl groups as the additive. Such good cycle property at high temperature is an advantageous effect of very great importance in lithium ion batteries etc. for vehicles, electricity storage systems, etc. that are expected to be used daily in high temperature environments around the equator.

Hereinabove, the present invention has been described using embodiments and Examples, but the present invention is not limited to these embodiments and Examples and may be variously modified. For example, although a description is given using a laminated large-sized lithium ion battery as an example in the embodiments and Examples described above, the present invention can be applied also to batteries of a circular cylindrical type, coin type, card type, flat type, elliptical type, rectangular type, button type, etc.

REFERENCE SIGNS LIST 1 negative electrode
2 first carbon (spherical graphite)
3 second carbon A (massive non-graphitizable carbon)
4 second carbon B (massive artificial graphite)
5 electrical conduction aid (plate-like graphite)
6 SEI
7 negative electrode current collector
8 electrolytic solution
9 additive
11 separator
12 positive electrode
13 positive electrode active material
14 carbon black
15 positive electrode current collector

The invention claimed is:

1. A negative electrode for a lithium ion secondary battery, comprising a negative electrode active material containing a first carbon and a second carbon, wherein
the first carbon is uncoated spherical natural graphite having a ratio of (length of minor axis)/(length of major axis) of larger than 0.2, wherein the minor axis is a direction in which the length is shortest and the major axis is a direction in which the length is longest, and having a structure in which flake-like graphite is folded into a spherical form, the second carbon is massive non-graphitizable carbon and/or massive artificial graphite, the massive non-graphitizable carbon and/or massive artificial graphite having a ratio of (length of minor axis)/(length of major axis) of larger than 0.2, wherein the minor axis is a direction in which the length is shortest and the major axis is a direction in which the length is longest, and in which schistosity is not observed, and a sulfur concentration in the first carbon (Sx) and a sulfur concentration in the second carbon (Sy) are each independently 0 ppm or more and 300 ppm or less.

2. The negative electrode for a lithium ion secondary battery according to claim 1, further comprising an electrical conduction aid and a binder, wherein the electrical conduction aid is plate-like graphite, GM(sf) is 0.1 to 1.1, wherein GM(sf) is a ratio (carboxyl group/phenol-type hydroxyl group) between carboxyl group and phenol-type hydroxyl group that are surface functional groups of the first carbon, and GV(sf) is 0.1 to 1.1, wherein GV(sf) is a ratio (carboxyl group/phenol-type hydroxyl group) between carboxyl group and phenol-type hydroxyl group that are surface functional groups of the second carbon.

3. The negative electrode for a lithium ion secondary battery according to claim 2, wherein a sulfur concentration in the electrical conduction aid (Sz) is 0 ppm or more and 300 ppm or less and GA(sf) is 0.1 to 1.1, wherein GA(sf) is a ratio (carboxyl group/phenol-type hydroxyl group) between carboxyl group and phenol-type hydroxyl group that are surface functional groups of the electrical conduction aid.

4. The negative electrode for a lithium ion secondary battery according to claim 2, wherein a thickness of the electrical conduction aid is 0.01 µm or more and 0.5 µm or less.

5. The negative electrode for a lithium ion secondary battery according to claim 1, wherein a sulfur concentration is 100 ppm or less in either the first carbon or the second carbon which has larger mass amount in the negative electrode active material.

6. The negative electrode for a lithium ion secondary battery according to claim 1, wherein the sulfur concentration in the first carbon (Sx) is 100 ppm or less.

7. The negative electrode for a lithium ion secondary battery according to claim 1, wherein the sulfur concentration in the second carbon (Sy) is 100 ppm or less.

8. A lithium ion secondary battery comprising:

the negative electrode for a lithium ion secondary battery according to claim 1;

a non-aqueous electrolytic solution containing an additive; and a positive electrode containing a positive electrode active material capable of absorbing and desorbing lithium.

9. The lithium ion secondary battery according to claim 8, wherein the non-aqueous electrolytic solution contains a cyclic sulfonic acid ester having two sulfonyl groups as an additive.

10. The lithium ion secondary battery according to claim 8, wherein the non-aqueous electrolytic solution contains a cyclic sulfonic acid ester represented by general formula (1) below having two sulfonyl groups as an additive,

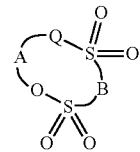

wherein Q represents an oxygen atom, methylene group, or a single bond, A represents substituted or unsubstituted alkylene group having 1 to 5 carbon atoms, carbonyl group, sulfinyl group, substituted or unsubstituted fluoroalkylene group having 1 to 6 carbon atoms, or divalent group having 2 to 6 carbon atoms in which alkylene units or fluoroalkylene units are bonded via an ether bond, and B represents substituted or unsubstituted alkylene group, substituted or unsubstituted fluoroalkylene group, or an oxygen atom.

11. The lithium ion battery according to claim 8, wherein a ratio between an average particle size of the first carbon $D_{50m}$ and an average particle size of the second carbon $D_{50v}$, $D_{50m}/D_{50v}$, is 1 or more and 8 or less.

12. The lithium ion secondary battery according to claim 8, wherein a ratio between an average particle size of the first carbon $D_{50m}$ and an average particle size of the plate-like graphite that is the electrical conduction aid $D_{50a}$, $D_{50m}/D_{50a}$, is 1 or more and 11 or less.

13. The lithium ion secondary battery according to claim 8, wherein the second carbon content is 5 mass % or more and 30 mass % or less based on the total weight of a negative electrode active material, an electrical conduction aid, and a binder contained in the negative electrode.

14. A method for manufacturing a lithium ion secondary battery including the negative electrode of claim 1, an electrolytic solution, and an outer casing, the method comprising:

a step of manufacturing the negative electrode using a negative electrode mixture obtained by mixing a negative electrode active material containing a first carbon and a second carbon;

a step of fabricating an electrode element in such a manner that a positive electrode and the negative electrode are disposed to face each other; and a step of enclosing the electrode element and an electrolytic solution into the outer casing, wherein the second carbon is massive non-graphitizable carbon and/or massive artificial graphite as defined in claim 1, and a sulfur concentration in the first carbon (Sx) and a sulfur concentration in the second carbon (Sy) are each independently 0 ppm or more and 300 ppm or less.

15. The negative electrode for a lithium ion secondary battery according to claim 1, wherein the first carbon content in the negative electrode is 50 mass % or more.

16. The negative electrode for a lithium ion secondary battery according to claim 1, wherein the second carbon is massive non-graphitizable carbon.

17. The negative electrode for a lithium ion secondary battery according to claim 1, wherein a ratio between an average particle size of the first carbon $D_{50m}$ and an average particle size of the second carbon $D_{50v}$, $D_{50m}/D_{50v}$, is 1 or more and 8 or less.

18. The negative electrode for a lithium ion secondary battery according to claim 1, wherein
the second carbon content is 5 mass % or more and 30 mass % or less based on the total weight of a negative electrode active material, an electrical conduction aid, and a binder contained in the negative electrode.

19. The negative electrode for a lithium ion secondary battery according to claim 18, wherein
the first carbon content in the negative electrode is 50 mass % or more based on the total weight of a negative electrode active material, an electrical conduction aid, and a binder contained in the negative electrode.

* * * * *